(12) United States Patent
Das et al.

(10) Patent No.: US 12,164,435 B2
(45) Date of Patent: *Dec. 10, 2024

(54) DEVICES, SYSTEMS, AND METHODS OF LOGICAL-TO-PHYSICAL ADDRESS MAPPING

(71) Applicant: SMART IOPS, INC., Milpitas, CA (US)

(72) Inventors: Ashutosh Kumar Das, Cupertino, CA (US); Manuel Antonio d'Abreu, El Dorado Hills, CA (US)

(73) Assignee: SMART IOPS, INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,225

(22) Filed: Jan. 26, 2023

(65) Prior Publication Data

US 2023/0251974 A1  Aug. 10, 2023

Related U.S. Application Data

(63) Continuation of application No. 16/996,827, filed on Aug. 18, 2020, now Pat. No. 11,580,030.

(Continued)

(51) Int. Cl.
*G06F 12/10* (2016.01)

(52) U.S. Cl.
CPC ........ *G06F 12/10* (2013.01); *G06F 2212/657* (2013.01)

(58) Field of Classification Search
CPC ......... G06F 12/0246; G06F 2212/7201; G06F 3/0679; G06F 2212/222; G06F 3/0688;

(Continued)

(56) References Cited

U.S. PATENT DOCUMENTS 8,112,395 B2  2/2012 Patel et al.
8,468,292 B2  6/2013 Aszmann et al.

(Continued)

OTHER PUBLICATIONS

Exploiting Sequential and Temporal Localities to Improve Performance of NAND Flash-Based SSDs; Lee et al.; ACM Transactions on Storage, vol. 12, iss. 3, Article No. 15; Jun. 2016 (Year: 2016).

(Continued)

*Primary Examiner* — Sanjiv Shah
*Assistant Examiner* — Edward Waddy, Jr.
(74) *Attorney, Agent, or Firm* — MT HUNT LAW; Marcus T. Hunt

(57) ABSTRACT

Devices, systems, and methods are provided that cause a controller to receive a first command to read or write first data from or to a first logical address; and determine a first mapped logical address that the first logical address is mapped to. A first plurality of logical addresses is mapped to the first mapped logical address and includes the first logical address. The controller reads a first data structure at the first mapped logical address. The first data structure includes a pointer to a first intermediate physical address. The controller reads a second data structure at the first intermediate physical address. The second data structure includes a plurality of pointers to target physical addresses. The plurality of pointers includes a pointer to a first target physical address for the first logical address. The controller reads or writes the first data from or to the first target physical address.

20 Claims, 12 Drawing Sheets

Related U.S. Application Data

(60) Provisional application No. 62/888,508, filed on Aug. 18, 2019.

(58) Field of Classification Search
CPC .. G06F 3/061; G06F 2212/2022; G06F 12/10; G06F 12/00; G06F 12/1027; G06F 2212/657
USPC ...... 711/103, 202, 12.001, 12.008, 206, 102, 711/12.058
See application file for complete search history.

(56) References Cited

U.S. PATENT DOCUMENTS

| | | | |
|---|---|---|---|
| 9,489,296 | B1 | 11/2016 | Tomlin et al. |
| 9,600,192 | B2 | 3/2017 | Chambliss et al. |
| 9,740,416 | B2 | 8/2017 | Chambliss et al. |
| 9,990,301 | B1 | 6/2018 | Kanaujia et al. |
| 10,222,984 | B1 | 3/2019 | O'Brien et al. |
| 10,228,878 | B1 * | 3/2019 | Mateescu ............... G06F 3/0679 |
| 10,552,085 | B1 | 2/2020 | Chen et al. |
| 2008/0109592 | A1 | 5/2008 | Karamcheti et al. |
| 2008/0288717 | A1 | 11/2008 | Torabi |
| 2009/0168525 | A1 | 7/2009 | Olbrich et al. |
| 2010/0122148 | A1 | 5/2010 | Flynn et al. |
| 2010/0174847 | A1 | 7/2010 | Paley et al. |
| 2010/0306447 | A1 | 12/2010 | Lin et al. |
| 2011/0060927 | A1 | 3/2011 | Fillingim et al. |
| 2012/0246391 | A1 | 9/2012 | Meir et al. |
| 2013/0124794 | A1 | 5/2013 | Bux et al. |
| 2013/0346675 | A1 * | 12/2013 | Yeh ..................... G06F 12/0246 711/E12.008 |
| 2014/0143213 | A1 | 5/2014 | Tal et al. |
| 2014/0143481 | A1 | 5/2014 | Asnaashari et al. |
| 2014/0304453 | A1 | 10/2014 | Shao et al. |
| 2015/0081983 | A1 | 3/2015 | Ries et al. |
| 2015/0117107 | A1 | 4/2015 | Sun et al. |
| 2015/0293809 | A1 | 10/2015 | Liang et al. |
| 2015/0317091 | A1 * | 11/2015 | Hussain .................. G06F 3/065 711/103 |
| 2015/0347302 | A1 | 12/2015 | Hagersten et al. |
| 2016/0062696 | A1 | 3/2016 | Cerrelli et al. |
| 2016/0062885 | A1 | 3/2016 | Ryu |
| 2016/0267012 | A1 * | 9/2016 | Konuma ............. G06F 12/0246 |
| 2016/0342509 | A1 * | 11/2016 | Kotte .................. G06F 12/0246 |
| 2018/0052768 | A1 | 2/2018 | Bae et al. |
| 2019/0087328 | A1 * | 3/2019 | Kanno ................. G06F 3/0688 |
| 2019/0121726 | A1 | 4/2019 | Hsu et al. |
| 2020/0097216 | A1 * | 3/2020 | Marcu .................. G06F 3/0659 |
| 2020/0104067 | A1 | 4/2020 | Shaharabany et al. |
| 2020/0133808 | A1 | 4/2020 | Patel et al. |

OTHER PUBLICATIONS

SSDExplorer: A Virtual Platform for Performance/Reliability-Oriented Fine-Grained Design Space Exploration of Solid State Drives; Zuolo et al.; IEEE Transactions on Computer-Aided Design of Integrated Circuits and Systems, vol. 34, iss. 10, pp. 1627-1638; Oct. 2015 (Year: 2015).

* cited by examiner

| Logical Address (201A) | Mapped Logical Address (N=2) (202A) | Intermediate Physical Address (203A) |
|---|---|---|
| 1 | 1 | A |
| 2 | | |
| 3 | 2 | B |
| 4 | | |
| 5 | 3 | C |
| 6 | | |
| 7 | 4 | D |
| 8 | | |
| 9 | 5 | E |
| 10 | | |
| 11 | 6 | F |
| 12 | | |
| 13 | 7 | G |
| 14 | | |
| 15 | 8 | H |
| 16 | | |

| Logical Address (201B) | Mapped Logical Address (N=4) (202B) | Intermediate Physical Address (203B) |
|---|---|---|
| 1 | 1 | A |
| 2 | | |
| 3 | | |
| 4 | | |
| 5 | 2 | B |
| 6 | | |
| 7 | | |
| 8 | | |
| 9 | 3 | C |
| 10 | | |
| 11 | | |
| 12 | | |
| 13 | 4 | D |
| 14 | | |
| 15 | | |
| 16 | | |

```
        0000                    0000
1 →     0001                    0001
        ────            1 →     0010
        0010                    0011
2 →     0011                    ────
        ────                    0100
        0100            2 →     0101
3 →     0101                    0110
        ────                    0111
        0110                    ────
4 →     0111                    1000
        ────            3 →     1001
        1000                    1010
5 →     1001                    1011
        ────                    ────
        1010                    1100
6 →     1011            4 →     1101
        ────                    1110
        1100                    1111
7 →     1101
        ────
        1110
8 →     1111
```

210 (for N=2)        211 (for N=4)

FIG. 2C              FIG. 2D

| | |
|---|---|
| Target Physical Address E | D1 (DATA) |
| Target Physical Address F | D2 (DATA) |
| Target Physical Address G | D3 (DATA) |
| Target Physical Address H | D4 (DATA) |
| Target Physical Address I | D5 (DATA) |
| Target Physical Address J | D6 (DATA) |
| Target Physical Address K | D7 (DATA) |
| Target Physical Address L | D8 (DATA) |
| Target Physical Address M | D9 (DATA) |
| Target Physical Address N | D10 (DATA) |
| Target Physical Address O | D11 (DATA) |
| Target Physical Address P | D12 (DATA) |
| Target Physical Address Q | D13 (DATA) |
| Target Physical Address R | D14 (DATA) |
| Target Physical Address S | D15 (DATA) |
| Target Physical Address T | D16 (DATA) |

FIG. 5

DEVICES, SYSTEMS, AND METHODS OF LOGICAL-TO-PHYSICAL ADDRESS MAPPING

CROSS-REFERENCE TO RELATED APPLICATIONS

This application is a continuation of U.S. patent application Ser. No. 16/996,827, filed on Aug. 18, 2020, which claims the benefit of U.S. Provisional Application No. 62/888,508, filed Aug. 18, 2019, the entireties of which are herein incorporated by reference.

FIELD

The present disclosure relates generally to the field of data storage, and more particularly to memory management.

BACKGROUND

A controller of a solid-state storage system uses logical-to-physical (L2P) address mappings to map logical addresses to physical addresses on a per logical address basis, where a single logical address is mapped to a single physical address. The L2P address mappings are typically stored in on-controller memory. The on-controller memory includes an address location for every logical address that is implemented. When a large set of logical addresses are implemented, the size requirements of the on-controller memory can be great.

SUMMARY

In certain aspects of the present disclosure, solid-state storage systems are provided that includes a controller; and a plurality of memory devices coupled to the controller, the plurality of memory devices for storing data and comprising non-volatile memory. The controller is configured to: receive a first command to read or write first data from or to a first logical address, respectively; and, determine a first mapped logical address that the first logical address is mapped to. A first plurality of logical addresses is mapped to the first mapped logical address, and the first plurality of logical addresses includes the first logical address. The controller is further configured to read a first data structure at the first mapped logical address. The first data structure includes a pointer to a first intermediate physical address that the first mapped logical address is mapped to, and the first data structure is located in an on-controller memory configured to be accessed by the controller. The controller is further configured to read a second data structure at the first intermediate physical address. The second data structure includes a plurality of pointers to target physical addresses for the first plurality of logical addresses, and the plurality of pointers includes a pointer to a first target physical address for the first logical address. The controller is further configured to read or write the first data from or to the first target physical address, respectively. The first target physical address is located in the plurality of memory devices.

In an embodiment, the on-controller memory includes dynamic random access memory (DRAM). The first data structure is located in the DRAM, and the second data structure at the first intermediate physical address is located in the plurality of memory devices.

In an embodiment, the first command is a command to write the first data to the first logical address. The first data is written to the target physical address. The controller is further configured to: receive a second command to write second data to a second logical address, wherein the first plurality of logical addresses comprises the second logical address; select a second intermediate physical address for the first mapped logical address to be mapped to; replace the pointer to the first intermediate physical address in the first data structure with a pointer to the second intermediate physical address; write the plurality of pointers in the second data structure to a third data structure at the second intermediate physical address; determine that the plurality of pointers comprises a pointer to a second target physical address for the second logical address; and write the second data to the second target physical address, wherein the second target physical address is located in the plurality of memory devices.

In an embodiment, the second logical address is the first logical address. The writing of the plurality of pointers in the second data structure to the third data structure includes: selecting the second target physical address as a new target physical address for the first logical address; and writing the pointer to the second target physical address in the third data structure in place of the pointer to the first target address for the first logical address.

In an embodiment, the on-controller memory comprises dynamic random access memory (DRAM). The first data structure is located in the DRAM. The second data structure at the first intermediate physical address and the third data structure at the second intermediate physical address are located in the plurality of memory devices. The controller is further configured to, based on the reading of the second data structure at the first intermediate physical address, write any one of the plurality of pointers in the second data structure to a cached location in the first data structure for a subsequent read or write command.

In an embodiment, the determining of the first mapped logical address includes referencing a logical-to-physical address mapping table. The logical-to-physical address mapping table maps: the first plurality of logical addresses to the first mapped logical address; and the first mapped logical address to the first intermediate address. The controller is further configured to, based on the selecting of the second intermediate physical address, modify the logical to physical address mapping table such that the first mapped logical address is mapped to the second intermediate physical address.

In an embodiment, the controller is further configured to: write the pointer to the first target physical address to a cached location in the first data structure; receive a second command to read the first data from the first logical address, respectively; determine that the first logical address is mapped to the first mapped logical address; read the first data structure at the first mapped logical address and determining that the pointer to the first target physical address in the cached location is for the first logical address; and read the first data from the first target physical address based on the determination that the pointer to the first target physical address in the cached location is for the first logical address.

In an embodiment, the plurality of pointers in the second data structure includes a pointer to a second target physical address for a second logical address. The first plurality of logical addresses includes the second logical address. The second target physical address is located in the plurality of memory devices. The controller is further configured to: based on the reading of the second data structure at the first intermediate physical address, write the pointer to the second target physical address to a cached location in the first data structure; receive a second command to read or write second data from or to the second logical address, respectively; determine that the second logical address is mapped to the first mapped logical address; read the first data structure at the first mapped logical address and determining that the pointer to the second target physical address in the cached location is for the second logical address; and read or write the second data from or to the second target physical address, respectively, based on the determination that the pointer to the second target physical address in the cached location is for the second logical address.

In certain aspects of the present disclosure, methods of logical-to-physical address mapping in a data storage system, are provided that include: receiving, by a controller, a first command to read or write first data from or to a first logical address, respectively; and determining, by the controller, a first mapped logical address that the first logical address is mapped to. A first plurality of logical addresses is mapped to the first mapped logical address, and the first plurality of logical addresses includes the first logical address. The method further includes reading, by the controller, a first data structure at the first mapped logical address. The first data structure includes a pointer to a first intermediate physical address that the first mapped logical address is mapped to, and the first data structure is located in an on-controller memory configured to be accessed by the controller. The method further includes reading a second data structure at the first intermediate physical address. The second data structure includes a plurality of pointers to target physical addresses for the first plurality of logical addresses, and the plurality of pointers includes a pointer to a first target physical address for the first logical address. The method further includes reading or writing the first data from or to the first target physical address, respectively, wherein the first target physical address is located in a plurality of memory devices comprising non-volatile memory, and wherein plurality of memory devices is coupled to the controller.

In an embodiment, the on-controller memory includes dynamic random access memory (DRAM). The first data structure is located in the DRAM, and the second data structure at the first intermediate physical address is located in the plurality of memory devices.

In an embodiment, the first command is a command to write the first data to the first logical address. The first data is written to the target physical address. The method further includes receiving, by the controller, a second command to write second data to a second logical address. The first plurality of logical addresses includes the second logical address. The method further includes selecting a second intermediate physical address for the first mapped logical address to be mapped to; replacing the pointer to the first intermediate physical address in the first data structure with a pointer to the second intermediate physical address; writing the plurality of pointers in the second data structure to a third data structure at the second intermediate physical address; determining that the plurality of pointers comprises a pointer to a second target physical address for the second logical address; and writing the second data to the second target physical address. The second target physical address is located in the plurality of memory devices.

In an embodiment, the second logical address is the first logical address. The writing of the plurality of pointers in the second data structure to the third data structure includes: selecting the second target physical address as a new target physical address for the first logical address; and writing the pointer to the second target physical address in the third data structure in place of the pointer to the first target address for the first logical address.

In an embodiment, the on-controller memory includes dynamic random access memory (DRAM). The first data structure is located in the DRAM. The second data structure at the first intermediate physical address and the third data structure at the second intermediate physical address are located in the plurality of memory devices. The method further includes, based on the reading of the second data structure at the first intermediate physical address, writing any one of the plurality of pointers in the second data structure to a cached location in the first data structure for a subsequent read or write command.

In an embodiment, the determining of the first mapped logical address by the controller includes accessing a logical-to-physical address mapping table. The logical-to-physical address mapping table maps: the first plurality of logical addresses to the first mapped logical address; and the first mapped logical address to the first intermediate address. The method further includes, based on the selecting of the second intermediate physical address, modifying the logical to physical address mapping table such that the first mapped logical address is mapped to the second intermediate physical address.

In an embodiment, the method further includes: writing the pointer to the first target physical address to a cached location in the first data structure; receiving, by the controller, a second command to read the first data from the first logical address, respectively; determining, by the controller, that the first logical address is mapped to the first mapped logical address; reading, by the controller, the first data structure at the first mapped logical address and determining that the pointer to the first target physical address in the cached location is for the first logical address; and reading the first data from the first target physical address based on the determination that the pointer to the first target physical address in the cached location is for the first logical address.

In an embodiment, the plurality of pointers in the second data structure includes a pointer to a second target physical address for a second logical address. The first plurality of logical addresses includes the second logical address. The second target physical address is located in the plurality of memory devices. The method further includes: based on the reading of the second data structure at the first intermediate physical address, writing the pointer to the second target physical address to a cached location in the first data structure; receiving, by the controller, a second command to read or write second data from or to the second logical address, respectively; determining, by the controller, that the second logical address is mapped to the first mapped logical address; reading, by the controller, the first data structure at the first mapped logical address and determining that the pointer to the second target physical address in the cached location is for the second logical address; and reading or writing the second data from or to the second target physical address, respectively, based on the determination that the pointer to the second target physical address in the cached location is for the second logical address.

In certain aspects of the present disclosure, a non-transitory computer readable storage medium, storing one or more programs for execution by a controller of a solid-state storage system, the one or more programs including instructions for performing operations including: receiving, by the controller, a first command to read or write first data from or to a first logical address, respectively; and, determining, by the controller, a first mapped logical address that the first logical address is mapped to. A first plurality of logical addresses is mapped to the first mapped logical address. The first plurality of logical addresses includes the first logical address. The operations further including reading, by the controller, a first data structure at the first mapped logical address. The first data structure includes a pointer to a first intermediate physical address that the first mapped logical address is mapped to. The first data structure is located in an on-controller memory configured to be accessed by the controller. The operations further including reading a second data structure at the first intermediate physical address. The second data structure includes a plurality of pointers to target physical addresses for the first plurality of logical addresses. The plurality of pointers includes a pointer to a first target physical address for the first logical address. The operations further including reading or writing the first data from or to the first target physical address, respectively. The first target physical address is located in a plurality of memory devices including non-volatile memory. The plurality of memory devices is coupled to the controller.

In an embodiment, the on-controller memory includes dynamic random access memory (DRAM). The first data structure is located in the DRAM. The second data structure at the first intermediate physical address is located in the plurality of memory devices.

In an embodiment, the first command is a command to write the first data to the first logical address. The first data is written to the target physical address. The operations further includes receiving, by the controller, a second command to write second data to a second logical address. The first plurality of logical addresses comprises the second logical address. The operations further includes: selecting a second intermediate physical address for the first mapped logical address to be mapped to; replacing the pointer to the first intermediate physical address in the first data structure with a pointer to the second intermediate physical address; writing the plurality of pointers in the second data structure to a third data structure at the second intermediate physical address; determining that the plurality of pointers comprises a pointer to a second target physical address for the second logical address; and writing the second data to the second target physical address, wherein the second target physical address is located in the plurality of memory devices.

In an embodiment, the second logical address is the first logical address. The writing of the plurality of pointers in the second data structure to the third data structure includes: selecting the second target physical address as a new target physical address for the first logical address; and writing the pointer to the second target physical address in the third data structure in place of the pointer to the first target address for the first logical address.

In an embodiment, the on-controller memory includes dynamic random access memory (DRAM), and the first data structure is located in the DRAM. The second data structure at the first intermediate physical address and the third data structure at the second intermediate physical address are located in the plurality of memory devices. The operations further include, based on the reading of the second data structure at the first intermediate physical address, writing any one of the plurality of pointers in the second data structure to a cached location in the first data structure for a subsequent read or write command.

In an embodiment, the determining of the first mapped logical address by the controller includes referencing a logical-to-physical address mapping table. The logical-to-physical address mapping table maps: the first plurality of logical addresses to the first mapped logical address; and the first mapped logical address to the first intermediate address. The operations further include, based on the selecting of the second intermediate physical address, modifying the logical to physical address mapping table such that the first mapped logical address is mapped to the second intermediate physical address.

In an embodiment, the operations further include: writing the pointer to the first target physical address to a cached location in the first data structure; receiving, by the controller, a second command to read the first data from the first logical address, respectively; determining, by the controller, that the first logical address is mapped to the first mapped logical address; reading, by the controller, the first data structure at the first mapped logical address and determining that the pointer to the first target physical address in the cached location is for the first logical address; and reading the first data from the first target physical address based on the determination that the pointer to the first target physical address in the cached location is for the first logical address.

In an embodiment, the plurality of pointers in the second data structure includes a pointer to a second target physical address for a second logical address. The first plurality of logical addresses includes the second logical address. The second target physical address is located in the plurality of memory devices. The operations further include: based on the reading of the second data structure at the first intermediate physical address, writing the pointer to the second target physical address to a cached location in the first data structure; receiving, by the controller, a second command to read or write second data from or to the second logical address, respectively; determining, by the controller, that the second logical address is mapped to the first mapped logical address; reading, by the controller, the first data structure at the first mapped logical address and determining that the pointer to the second target physical address in the cached location is for the second logical address; and reading or writing the second data from or to the second target physical address, respectively, based on the determination that the pointer to the second target physical address in the cached location is for the second logical address.

BRIEF DESCRIPTION OF THE DRAWINGS

For a better understanding of at least an embodiment, reference will be made to the following Detailed Description, which is to be read in conjunction with the accompanying drawings, wherein:

FIG. 2A illustrates a diagram of an example logical-to-physical address mapping table with two logical addresses mapped to an intermediate physical address, according to an embodiment.

FIG. 2B illustrates a diagram of an example logical-to-physical address mapping table with four logical addresses mapped to an intermediate physical address, according to an embodiment.

FIG. 2C illustrates an example logical translation scheme that can be used to determine the mapped logical addresses and the intermediate physical addresses for 16 logical addresses where N=2, according to an embodiment.

FIG. 2D illustrates an example logical translation scheme that can be used to determine the mapped logical addresses and the intermediate physical addresses for 16 logical addresses where N=4, according to an embodiment.

FIG. 5 illustrates a diagram of the target physical addresses of FIG. 4, according to an embodiment.

DETAILED DESCRIPTION

Figure 1A:
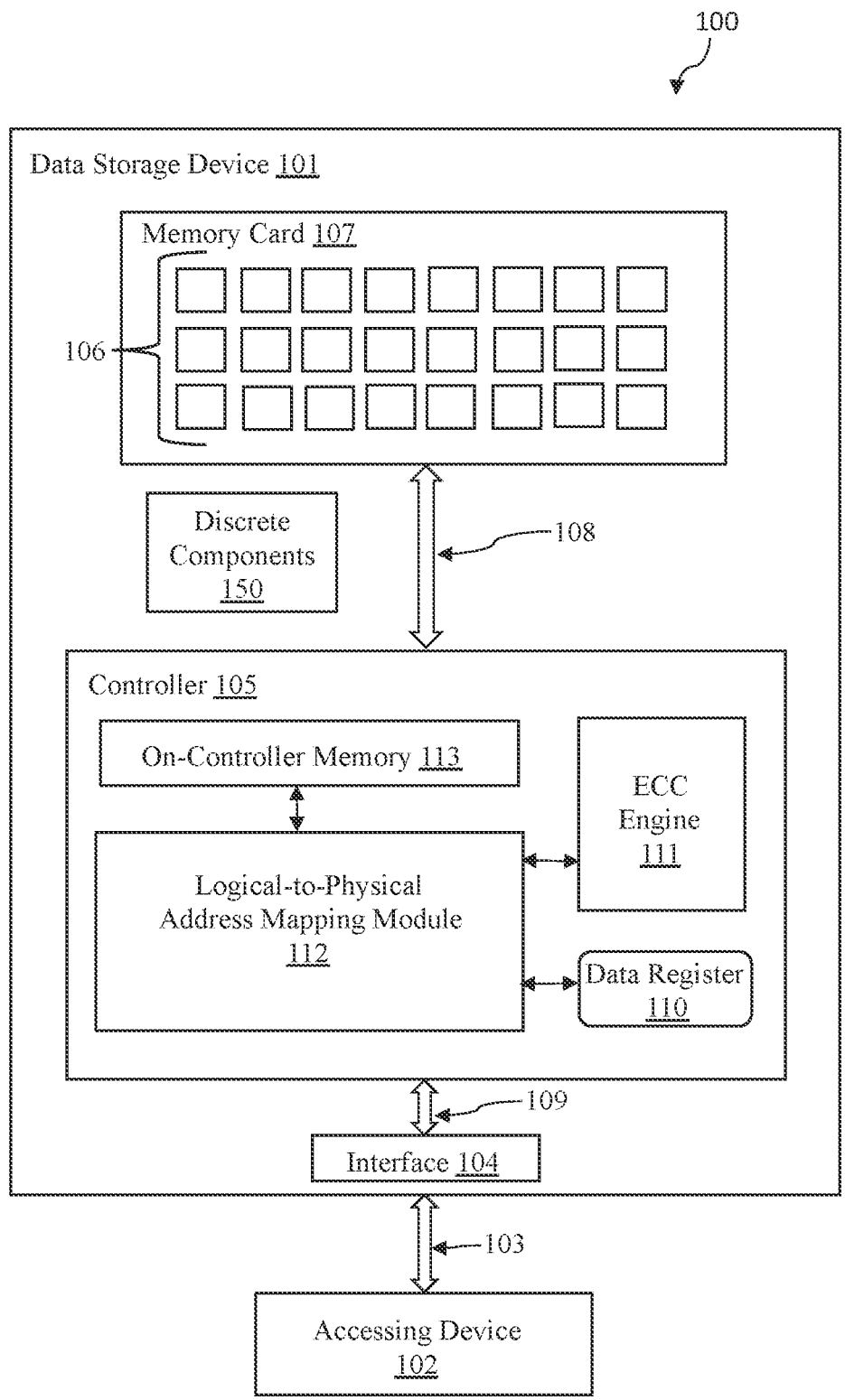
FIG. 1A illustrates a block diagram of an example data storage system having dynamic remapping capability, according to an embodiment.

Before aspects of the present disclosure are described below with reference to the drawings in the description, common features may be designated by common reference numbers. Although certain examples are described herein with reference to a data storage system, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more conditions, or events not explicitly recited. As used herein, "exemplary" may indicate an example, an implementation, and/or an aspect, and should not be construed as limiting or as indicating a preference or a preferred example, implementation, and/or aspect.

In certain aspects of the present disclosure, devices, systems, and methods are provided that incorporate unique techniques for logical-to-physical address mapping. The techniques can be used to map logical addresses, such as those received by the accessing device for read and write commands, to physical addresses in memory devices used for mass storage, such as the memory devices within solid-state storage systems (e.g., solid-state drives). The techniques can be applicable to any type of memory where a logical-to-physical address mapping is used, such as with flash memory for instance. The techniques can be applicable on a device level, such as with a NAND device or any other memory device using logical-to-physical mapping. The techniques can also be applicable on a system level, such as with solid-state storage systems, including solid-state drives.

In certain aspects, hierarchical logical-to-physical address mappings are provided that maps more than one logical address (or N logical addresses) to an intermediate address, where a data structure is located with a pointer to a respective target physical address for each of the N logical addresses. The N logical addresses are collectively mapped to another logical address (referred to herein as a "mapped logical address"), which is mapped to the intermediate address. It should be appreciated that there can be one or more groups of N logical addresses that are mapped in this manner; however, at times description is only provided for one group of N logical addresses to facilitate understanding. It should be appreciated that the description can also apply to any additional groups of N logical addresses implemented. For example, a total set of logical addresses can be divided up such that each group of N logical addresses is mapped to a respective mapped logical address, which are each mapped to a respective intermediate physical address. Additional details for the mapped logical addresses and intermediate physical addresses are provided in the description of the figures.

In certain aspects, cached hierarchical logical-to-physical address mappings are provided that enable the caching of one or more of the pointers to the target physical addresses for each of the N logical addresses. At each mapped logical address is a data structure that includes a pointer to the respective intermediate physical address to which it is mapped, as well as one or more cached locations. The cached locations can be used to cache one or more pointers to the target physical addresses that are stored in the data structure at the intermediate address. In this way, if a pointer to a target physical address for a given logical address is already cached, then reading the data structure at the intermediate physical address may not be necessary for a future read or write command. Various caching schemes can be implemented to cache one or more of the pointers to the target physical addresses. Additional details for the caching feature are provided in the description of the figures.

As stated earlier, a total set of logical addresses can be divided up such that each group of N logical addresses is mapped to a respective mapped logical address, which are each mapped to a respective intermediate physical address. In such case, the total number of mapped logical addresses is a fraction (1/N) of the total number of the logical addresses. In this way, the number of address locations to store the mapped logical addresses is a fraction (1/N) of the number of address locations that would be required to store every logical address. In embodiments where the logical-to-physical address mapping table and the data structures at the mapped logical addresses are stored in an on-controller memory, the size of the on-controller memory can be significantly reduced. The target physical addresses are located in the memory devices used for mass storage. In an embodiment, the data structure at the intermediate addresses is also stored in the memory device used for mass storage.

The term "on-controller memory" is used herein to refer generally to memory that is integrated within the controller, or coupled externally to the controller, and that includes one or more instructions or programs for execution by the controller, where the one or more programs include instructions for performing operations. The on-controller memory is distinguished from the "main memory" including the memory devices, where data is read from or written to for mass data storage. The on-controller memory can include, for example, static random-access memory (SRAM) or dynamic random-access memory (DRAM). In an embodiment, the on-controller memory includes dynamic random-access memory (DRAM) that the controller can access readily and that is faster than NAND memory in the main memory. In an embodiment, the logical-to-physical address mapping table and the associated data structures at the mapped logical address are stored in the DRAM.

The figures presented and described herein are provided as illustrative and non-limiting examples to facilitate understanding. One skilled in the art can appreciate that the underlying principles can be applicable to other embodiments and implementations than those shown or described in the examples. Furthermore, at times description is only provided for one group of N logical addresses, but one skilled in the art can appreciate that the underlying principles can also apply to any additional groups of N logical addresses implemented.

FIG. 1A illustrates a block diagram of an example data storage system having dynamic remapping capability, according to an embodiment. A data storage system 100 is shown including a data storage device (or system) 101 and an accessing (or host) device 102. The data storage device 101 and the accessing device 102 are coupled via a communication path 103, such as a bus or a wireless connection. The data storage device 101 can include an interface 104 (e.g., an accessing device interface) that enables communication via the communication path 103 between the data storage device 101 and the accessing device 102. The interface 104 can include, for example, a PCIe, SATA, USB, Open CAPI, or any other standard or proprietary interface.

The data storage device 101 is also shown including a controller 105 (e.g., a memory controller) and memory devices 106 on a memory card 107. The controller 105 and the memory devices 106 are coupled via a communication path 108, such as a bus. The memory devices 106 can include one or more memory dies. The controller 105 is coupled to the interface 104 via a communication path 109, such as a bus. In one embodiment, the controller 105 is an SSD controller and the memory devices 106 are non-volatile memory, such as Flash memory.

In an embodiment, the data storage device 101 can be embedded within the accessing device 102, such as in accordance with a Joint Electron Devices Engineering Council (JEDEC) Solid State Technology Association Universal Flash Storage (UFS) configuration. For example, the data storage device 101 can be configured to be coupled to the accessing device 102 as embedded memory, such as eMMC® (trademark of JEDEC Solid State Technology Association, Arlington, Virginia) and eSD, as illustrative examples. To illustrate, the data storage device 101 can correspond to an eMMC (embedded MultiMedia Card) device. As another example, the data storage device 101 can correspond to a memory card, such as a Secure Digital (SD®) card, a microSD® card, a miniSD™ card (trademarks of SD-3C LLC, Wilmington, Delaware), a MultiMediaCard™ (MMC™) card (trademark of JEDEC Solid State Technology Association, Arlington, Virginia), or a CompactFlash® (CF) card (trademark of SanDisk Corporation, Milpitas, California). Alternatively, the data storage device 101 can be removable from the accessing device 102 (i.e., "removably" coupled to the accessing device 102). As an example, the data storage device 101 can be removably coupled to the accessing device 102 in accordance with a removable universal serial bus (USB) configuration.

In an embodiment, the data storage device 101 can include (or correspond to) a solid-state drive (SSD), which can be included in, or distinct from (and accessible to), the accessing device 102. For example, the data storage device 101 can include an SSD, which can be used as an embedded storage drive (e.g., a mobile embedded storage drive), an enterprise storage drive (ESD), a client storage device, or a cloud storage drive, as illustrative, non-limiting examples. In some implementations, the data storage device 101 can be coupled to the accessing device 102 indirectly, e.g., via a network. For example, the network can include a data center storage system network, an enterprise storage system network, a storage area network, a cloud storage network, a local area network (LAN), a wide area network (WAN), the Internet, and/or another network. In some implementations, the data storage device 101 can be a network-attached storage (NAS) device or a component (e.g., an SSD device) of a data center storage system, an enterprise storage system, or a storage area network.

In some implementations, the data storage device 101 can operate in compliance with a JEDEC industry specification. For example, the data storage device 101 can operate in compliance with a JEDEC eMMC specification, a JEDEC Universal Flash Storage (UFS) specification, one or more other specifications, or a combination thereof. In some implementations, the data storage device 101 and the accessing device 102 can be configured to communicate using one or more protocols, such as an eMMC protocol, a universal Flash storage (UFS) protocol, a universal serial bus (USB) protocol, a serial advanced technology attachment (SATA) protocol, and/or another protocol, as illustrative, non-limiting examples.

The accessing device 102 can include a memory interface (not shown) and can be configured to communicate with the data storage device 101 via the memory interface to read data from and write data to the memory devices 106 of the data storage device 101. For example, the accessing device 102 can operate in compliance with a Joint Electron Devices Engineering Council (JEDEC) industry specification, such as a Universal Flash Storage (UFS) Access Controller Interface specification. As other examples, the accessing device 102 can operate in compliance with one or more other specifications, such as a Secure Digital (SD) Access Controller specification, as an illustrative and non-limiting example. The accessing device 102 can communicate with the memory devices 106 in accordance with any other suitable communication protocol.

The accessing device 102 can include one or more processors and memory (not shown in FIG. 1A). The memory can be configured to store data and/or instructions that can be executable by the processor. The memory can be a single memory or can include multiple memories, such as one or more non-volatile memories, one or more volatile memories, or a combination thereof. The accessing device 102 can issue one or more commands to the data storage device 101, such as one or more requests to erase data, read data from, or write data to the memory devices 106 of the data storage device 101. For example, the accessing device 102 can be configured to provide data to be stored at the memory devices 106 or to request data to be read from the memory devices 106. The accessing device 102 can include, for example, a mobile telephone, a computer (e.g., a laptop, a tablet, or a notebook computer), a music player, a video player, a gaming device or console, an electronic book reader, a personal digital assistant (PDA), a portable navigation device, a computer, such as a laptop computer or notebook computer, a network computer, a server, any other electronic device, or any combination thereof.

Figure 1B:
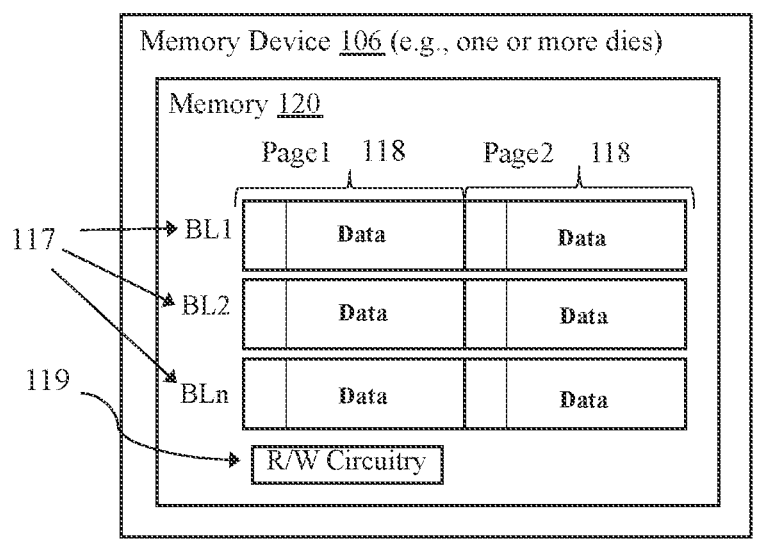
FIG. 1B illustrates a block diagram of an example memory device 106 of FIG. 1A, according to an embodiment.

FIG. 1B illustrates a block diagram of an example memory device 106 of FIG. 1A, according to an embodiment. The memory device 106 can include one or more memory dies (e.g., one memory die, two memory dies, eight memory dies, or another number of memory dies). The memory device 106 includes one or more memory 120, such as a non-volatile memory of storage elements included in a memory die of the memory device 106. For example, the memory 120 can include a Flash memory, such as a NAND Flash memory, or a resistive memory, such as a resistive random access memory (ReRAM), as illustrative, non-limiting examples. In some implementations, the memory 120 can include (or correspond to) a memory die of the memory device 106. The memory 120 can have a three-dimensional (3D) memory configuration. As an example, the memory 120 can have a 3D vertical bit line (VBL) configuration. In a particular implementation, the memory 120 can be a non-volatile memory having a 3D memory configuration that is monolithically formed in one or more physical levels of arrays of memory cells having an active area disposed above a silicon substrate. Alternatively, the memory 120 can have another configuration, such as a two-dimensional (2D) memory configuration or a non-monolithic 3D memory configuration (e.g., a stacked die 3D memory configuration). While only a single memory 120 is shown in the memory device 106 for exemplary reasons in FIG. 1B, it should be appreciated that the discussion for the memory 120 can be applicable to any additional memory 120 implemented within the memory device 106.

The memory 120 can include one or more blocks 117, such as one or more NAND Flash erase blocks. To illustrate, the memory 120 may include at least one block 117 of storage elements (e.g., also referred to herein as memory cells). Each storage element of the memory 120 can be programmable to a state (e.g., a threshold voltage in a Flash configuration or a resistive state in a resistive memory configuration) that indicates one or more values. In some implementations, the memory 120 can include multiple blocks 117. Each block 117 of the memory 120 can include one or more word lines. Each word line can include one or more pages 118, such as one or more physical pages. In some implementations, each page 118 may be configured to store a codeword. A word line may be configurable to operate as a single-level-cell (SLC) word line, as a multi-level-cell (MLC) word line, or as a tri-level-cell (TLC) word line, as illustrative, non-limiting examples.

The memory device 106 can include support circuitry, such as read/write circuitry 119, to support operation of one or more memory dies of the memory device 106. The read/write circuitry 119 can be divided into separate components, such as read circuitry and write circuitry. The read/write circuitry 119 can be external to the one or more dies of the memory device 106. Alternatively, one or more individual memory dies of the memory device 106 can include corresponding read/write circuitry 119 that is operable to read data from, and/or write data to, storage elements within the individual memory die independent of any other read and/or write operations at any of the other memory dies.

Returning to FIG. 1A, the controller 105 can manage communication to the accessing device 102, access to the memory devices 106, and memory management software. The controller 105 can communicate with the memory devices 106 via the communication path 108. The communication path 108 can be implemented, for example, as a bus having one or more channels to enable the controller 105 to communicate with a single memory die of the memory device 106. As another example, the communication path 108 can be implemented as a bus having multiple distinct channels to enable the controller 105 to communicate with each memory die of the memory devices 106 in parallel with, and independently of, communication with other memory dies of the memory device 106.

The controller 105 is configured to receive data and instructions from the accessing device 102 and to send data to the accessing device 102. For example, the controller 105 may send data to the accessing device 102 via the interface 104, and the controller 105 may receive data from the accessing device 102 via the interface 104. The controller 105 is configured to send data and commands to the memory 120, and to receive data from the memory 120, via the communication path 108. For example, the controller 105 is configured to send data and a write command to cause the memory 120 to store data to a physical address location (or physical address) of the memory 120. The write command can specify a physical address location of a portion of the memory 120 (e.g., a physical address location of a word line of the memory 120) that is to store the data. The controller 105 can also be configured to send data and commands to the memory 120, such as associated with background scanning operations, garbage collection operations, and/or wear leveling operations, etc., as illustrative, non-limiting examples. The controller 105 can also be configured to send a read command to the memory 120 to access data from a specified physical address location of the memory 120. The read command can, for example, specify the physical address location of a portion of the memory 120 (e.g., a physical address location of a word line of the memory 120).

The controller 105 is shown including a data register 110, an ECC engine 111, a logical-to-physical address mapping module 112, and on-controller memory 113. The data register 110 is coupled to the accessing device 102 via the interface 104 and the communication paths 103 and 109. The data register 110 is also coupled to the ECC engine 111, which is coupled to the memory 106 via communication path 108. The data register 110 can be configured to receive incoming data from the accessing device 102 that is intended to be stored in the memory devices 106.

The ECC engine 111 can process (e.g., add error correction codes) the incoming data before being sending the incoming data to the memory devices 106 via the communication path 108. The ECC engine 111 can also process (e.g., check for errors, remove error correction codes, etc.) when data is read from the memory devices 106 and sent to the accessing device 102. The ECC engine 111 can include an encoder configured to encode the data using an ECC encoding technique. For example, the ECC engine 111 can include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples. The error correction is not necessarily required in all embodiments. In an embodiment, the error correction is not implemented and the data storage device 101 does not include the ECC engine 111.

The data storage device 101 is also shown including discrete components 150. The discrete components 150 can be implemented to assist with various operations of the storage device 101, and can include passive components such as capacitors, resistors, and inductors, as well as active components such as diodes and transistors. This list of components is an illustrative and not exhaustive.

The logical-to-physical address mapping module 112 maps logical addresses, such as those received by the accessing device 102, to physical addresses of memory on the memory devices 106 of the data storage device 101. The logical-to-physical address mapping module 112 can map more than one logical address to an intermediate physical address. Put another way, N logical addresses can be mapped to an intermediate physical address, where N is more than one. For example, a total set of logical addresses can be divided up into groups of N logical addresses, with each group of N logical addresses being mapped to a respective mapped logical address. Each of the mapped logical addresses is mapped to a respective intermediate physical address. In such case, the total number of mapped logical addresses will be a fraction (1/N) of the total number of the logical addresses. For example, 100 logical addresses can be divided into 25 groups of 4 logical addresses (i.e., N=4), where each group of 4 logical addresses are mapped to a respective mapped logical address that is mapped to a respective intermediate physical address. The total number of logical addresses and the value of N can vary in different embodiments. Furthermore, in certain embodiments, each group of N logical addresses that are implemented can have a different number of logical addresses. As an illustrative and non-limiting example, a total set of 100 logical addresses can be dividend up into 30 different groups, where 20 groups of 4 logical addresses (i.e., N=4) and 10 groups of 2 logical addresses (i.e., N=2). The logical-to-physical address mapping module 112 also accesses and manages a logical-to-physical address mapping table including the logical addresses, the mapped logical addresses, and the intermediate physical addresses. In certain embodiments, the logical-to-physical address mapping module 112 can utilize a logical translation scheme instead of an address mapping table to infer the mapped logical address and intermediate physical address from the logical address. Additional details are provided later in FIGS. 2A and 2B (provided as illustrative non-limiting examples of a logical-to-physical address mapping tables where N=2 and N=4, respectively) and FIGS. 2C and 2D (provided as illustrative non-limiting examples of a logical translation scheme where N=2 and N=4, respectively).

The logical-to-physical address mapping module 112 also manages access (e.g., reading and writing) to data structures at the mapped logical addresses and the intermediated physical addresses. At each mapped logical address is a data structure having a pointer to the corresponding intermediate physical address to which the mapped logical address is mapped. The data structures at the mapped logical address can also include X number of cached locations, where X≤(N−1) in a preferred embodiment. Additional details are provided later in FIG. 3, which is provided as an illustrative and non-limiting example of data structures at an example mapped logical address. In one embodiment, the data structures for the mapped logical address are stored in the on-controller memory 113. The on-controller memory can be integrated within the controller or coupled externally to the controller. The on-controller memory can include different types of memory. In an embodiment, the on-controller memory includes dynamic random-access memory (DRAM).

At each of the intermediate physical addresses is a data structure having a pointer for each of the N logical addresses mapped to the intermediate physical address. Each pointer points to a "target" physical address where the actual data is to be read from, or written to, for the respective logical address. In a preferred embodiment, the data structures are not stored in the on-controller memory 113, but rather in the data storage portion of the storage device (or memory device), such as the memory devices 106 of the storage device 101 FIG. 1. In another embodiment, the data structures are stored in the on-controller memory 113. The data structures can be stored separately or together. Additional details are provided later in FIG. 4, which is provided as an illustrative and non-limiting example of data structures at the intermediate physical addresses.

The data structures at the mapped logical address can include X number of cached locations, where X≤(N−1) in the preferred embodiment. In another embodiment, a portion (e.g., one or more) of the data structures at the mapped logical address can include N cached locations, which may affect the amount of storage size that is reduced. The cached locations can be configured to store one or more pointers to the target physical address, which are read from the data structures at the intermediate physical address. In this way, the pointers to the target physical address are available at the mapped logical address for future read or write accesses. In this way, if a pointer to a target physical address for a given logical address is already cached, then reading the data structure at the intermediate physical address may not be necessary for a future read or write. Any type of caching scheme can be implemented to cache one or more of the pointers accessed in the data structure at interim physical address.

It should be appreciated that the data storage system 100 is an illustrative example and not intended to be limiting. Other embodiments of the data storage system and data storage device can vary from the embodiment show without compromising the underlying principles of techniques presented herein. For example, in other embodiments, the data storage device can include a centralized controller or distributed controller; the memory devices can be included on more than one memory card; one or more memory devices can be external to (or remote from) the data storage device and communicatively coupled to the data storage device; either or both of the ECC engine and the data register can not be implemented; additional components can include more or less components. In certain aspects, the techniques presented herein can be applicable to flash memory (e.g., NAND flash memory), as well as any other type of memory where address mapping is implemented. The techniques presented herein can be applicable to other configurations of data storage devices and system than shown in FIG. 1.

FIG. 2A illustrates a diagram of an example logical-to-physical address mapping table with two logical addresses mapped to an intermediate physical address, according to an embodiment. A logical-to-physical address mapping table 200A (also referred to herein as "mapping table 200A") is shown and includes columns for logical addresses 201A, mapped logical addresses 202A, and intermediate physical addresses 203A.

The logical addresses 201A include the logical addresses that are implemented. For example, the logical addresses 201A can be the logical addresses that the accessing device 102 sends to the storage device 101 with a read or write command. For the sake of clarity and brevity, only sixteen example logical addresses 201A are shown as a non-limiting example. It should be appreciated that the number of logical addresses can vary in other embodiments without compromising the underlying principles of the techniques presented herein.

Each of the mapped logical addresses 202A has two (i.e., N=2) of the logical addresses 201A mapped thereto. Each of the mapped logical addresses 202A is mapped to one of the intermediate physical addresses 203A. For example, in FIG. 2A, logical addresses 1 and 2 are mapped to mapped logical address 1, which is mapped to intermediate physical address A; logical addresses 3 and 4 are mapped to mapped logical address 2, which is mapped to intermediate physical address B; logical addresses 5 and 6 are mapped to mapped logical address 3, which is mapped to intermediate physical address C; etc.

FIG. 2B illustrates a diagram of an example logical-to-physical address mapping table with four logical addresses mapped to an intermediate physical address, according to an embodiment. A logical-to-physical address mapping table 200B (also referred to herein as "mapping table 200B") is shown and includes columns for logical addresses 201B, mapped logical addresses 202B, and intermediate physical addresses 203B.

The logical addresses 201B include the logical addresses that are implemented. For example, the logical addresses 201B can be the logical addresses that the accessing device 102 sends to the storage device 101 with a read or write command. For the sake of clarity and brevity, only sixteen example logical addresses 201B are shown as a non-limiting example.

Each of the mapped logical addresses 202 is mapped to one of the intermediate physical addresses 203. For example, in FIG. 2A, logical addresses 1 through 4 are mapped to mapped logical address 1, which is mapped to intermediate physical address A; logical addresses 5 through 8 are mapped to mapped logical address 2, which is mapped to intermediate physical address B; logical addresses 9 through 12 are mapped to mapped logical address 3, which is mapped to intermediate physical address C; and, logical addresses 13 through 16 are mapped to mapped logical address 4, which is mapped to intermediate physical address D.

At each mapped logical address is a data structure having a pointer to the corresponding intermediate physical address to which the mapped logical address is mapped. The mapped logical address can include X number of cached locations, where X≤(N−1) in the preferred embodiment. In one embodiment, the data structures for the mapped logical address 202 are stored in on-controller memory 113.

In certain embodiments, the logical-to-physical address mapping module 112 can utilize a logical translation scheme (e.g., mathematical scheme) instead of an address mapping table to infer the mapped logical address and intermediate physical address from the logical address. FIGS. 2C and 2D illustrate example logical translation schemes that can be used to determine the mapped logical addresses and the intermediate physical addresses for 16 logical addresses with N=2 and N=4, respectively, according to an embodiment.

In FIG. 2C, 16 logical addresses are shown listed from 0000 to 1111. To facilitate understanding, lines are shown separating the logical addresses into 8 groups (groups 1, 2, 3, 4, 5, 6, 7, and 8) of 2 logical addresses (N=2). To determine the mapped logical address and the intermediate physical address of any given logical address, a logical translation scheme can be implemented which drops the last bit and only reads the first 3 bits (reference numeral 210) of any logical address to determine the appropriate mapped logical address and intermediate physical address. For example, the logical addresses 0000 and 0001 in group 1 have the first 3-bits of "000" (or "0" as represented in binary), the logical addresses 0010 and 0011 in group 2 have the first 3-bits of "001" (or "1" as represented in binary), the logical addresses 0100 and 0101 in group 3 have the first 3-bits of "010" (or "2" as represented in binary), the logical addresses 0110 and 0111 in group 4 have the first 3-bits of "011" (or "3" as represented in binary), and so on for the remainder of the logical addresses. The mapped logical addresses and the intermediate physical addresses can be inferred based on the first 3 bits. For example, "000" of group 1 can represent the mapped logical address 1 and the intermediate physical address A, "001" of group 2 can represent mapped logical address 2 and the intermediate physical address B, "010" of group 3 can represent mapped logical address 3 and the intermediate physical address C, and so on.

In FIG. 2D, 16 logical addresses are shown listed from 0000 to 1111. To facilitate understanding, lines are shown separating the logical addresses into 4 groups (groups 1, 2, 3, and 4) of 4 logical addresses (N=4). To determine the mapped logical address and the intermediate physical address of any given logical address, a logical translation scheme can be implemented which drops the last 2 bits and only reads the first 2 bits (reference numeral 211) of any logical address to determine the appropriate mapped logical address and intermediate physical address. For example, the logical addresses 0000, 0001, 0010, and 0011 in group 1 have the first 2-bits of "00" (or "0" as represented in binary); the logical addresses 0100, 0101, 0110, and 0111 in group 2 have the first 2-bits of "01" (or "1" as represented in binary); the logical addresses 1000, 1001, 1010, and 1011 in group 3 have the first 2-bits of "10" (or "2" as represented in binary), and so on for the remainder of the logical addresses. The mapped logical addresses and the intermediate physical addresses can be inferred based on the first 2 bits. For example, "00" of group 1 can represent the mapped logical address 1 and the intermediate physical address A, "01" of group 2 can represent mapped logical address 2 and the intermediate physical address B, "10" of group 3 can represent mapped logical address 3 and the intermediate physical address C, and so on. It should be appreciated that this is an illustrative and non-limiting example of a logical translation scheme and that other logical translation scheme can be implemented in other embodiments.

Figure 3:
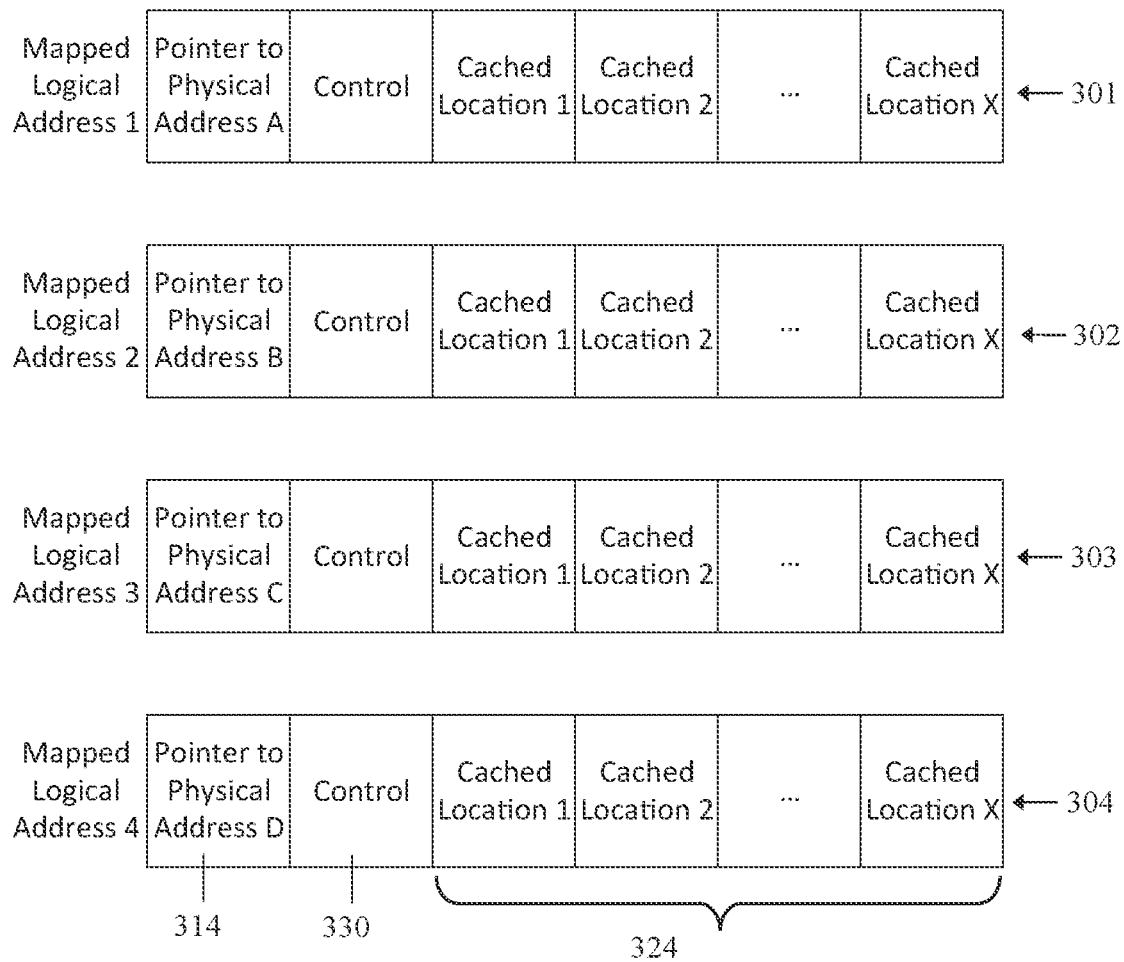
FIG. 3 illustrates a diagram of example data structures at the mapped logical addresses of FIG. 2B, according to an embodiment.

FIG. 3 illustrates a diagram of example data structures at the mapped logical addresses 202B of FIG. 2B, according to an embodiment. In FIG. 3, data structures 301, 302, 303, and 304 are shown for the mapped logical addresses 1, 2, 3, and 4 of FIG. 2B, respectively. Each of the data structures 301, 302, 303, and 304 include a pointer to its respective intermediate physical address identified in FIG. 2B, X number of cached locations, where X≤(N−1) in a preferred embodiment, and control data that is used to indicate which target physical addresses are stored in which cached locations. For example, in FIG. 3, data structure 304 at mapped logical address 4 includes a pointer 314 to intermediate physical address D, as well as cached locations 1 through X, which are represented as a whole by reference numeral 324. Each of the cached locations 324 can store a target physical address (e.g., from current or prior operations) according to any of a variety of implemented caching schemes. For instance, any of the cached locations 324 can store one of the target physical address Q, R, S, and T that resulted from a current or prior operation based on an implemented caching scheme. The data structure 304 also includes control data 330 that is used to indicate which target physical addresses Q, R, S, or T, if any, are stored in each of the cached locations 324.

In a preferred embodiment, the data structures 301, 302, 303, and 304 are stored in on-controller memory, which can be integrated within the controller or coupled externally to the controller. The on-controller memory can include dynamic random-access memory (DRAM), for instance.

Portions of the data structures 301, 302, 303, and 304 can be stored in the same or different memories, types of memories, etc. In one embodiment, a portion of the data structures 301, 302, 303, and 304 can be stored in the on-controller memory and another portion in the main memory including the memory devices 106. For example, as an illustrative and non-limiting example, in FIG. 3, the pointer 314 (and the control 315) can be broken up where the pointer 314 and the control 315 are stored in the on-controller memory 113 while the cached locations 324 are stored in the main memory including the memory devices 106.

Figure 4:
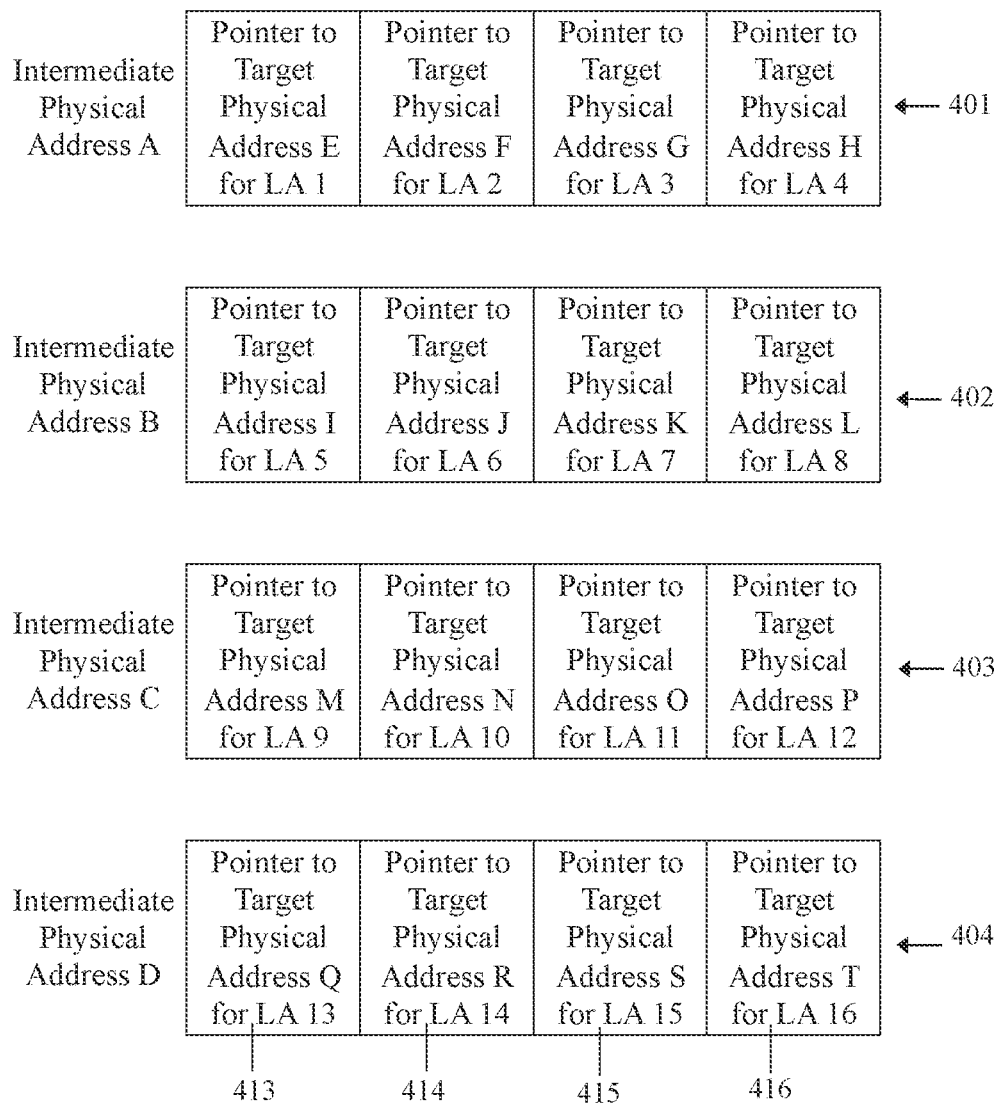
FIG. 4 illustrates a diagram of data structures at the intermediate physical addresses shown in FIGS. 2B and 3, according to an embodiment.

FIG. 4 illustrates a diagram of data structures at the intermediate physical addresses shown in FIGS. 2B and 3, according to an embodiment. In FIG. 4, data structures 401, 402, 403, and 404 are shown for the intermediate physical addresses A, B, C, and D of FIGS. 2B and 3, respectively. Each of the data structures 401, 402, 403, and 404 includes a pointer for each of the four (N=4) logical addresses mapped to the respective data structure. Each pointer points to a target physical address in the memory devices 106 where the actual data is to be read from, or written to, for the respective logical address. For example, data structure 404 at intermediate physical address D includes a pointer 413 to target physical address Q where the actual data is to be read from, or written to, for a read or write command for logical address 13 of FIG. 2B. The data structure 404 for intermediate physical address D also includes pointers 414, 415, and 416 to respective target physical addresses R, S, and T where the actual data is to be read from, or written to, for a read or write command for respective logical addresses 14, 15, and 16 of FIG. 2B.

The pointers in a given data structure at the intermediate physical address are located together (e.g., in a contiguous manner) with respect to each other. For example, with data structure 404 in FIG. 4, the pointer 413 can be located at the physical address D, the pointer 414 can be located at the physical address D+1, the pointer 415 can be located at the physical address D+2, and the pointer 416 can be located at the physical address D+3.

In a preferred embodiment, the data structures 401, 402, 403, and 404 are not stored in the on-controller memory, but rather in the "main memory" or data storage portion of the storage device (e.g., the memory devices 106 of the storage device 101 FIG. 1). In some implementations, the data structures 401, 402, 403, and 404 can be stored in regions of the main memory with faster blocks than the blocks in other regions of the memory where the actual data is stored. For example, certain blocks can be programmed to be faster than other blocks. The faster blocks can include, for example, special NAND devices with faster reading capability. For instance, some blocks can be implemented with single-level cells (SLC) to provide faster read speeds and require less sensing than blocks implemented with multi-level cells (MLC), triple-level cells (TLC), or quad-level cells (QLC). In another embodiment, the data structures 401, 402, 403, and 404 can be stored in the on-controller memory.

FIG. 5 illustrates a diagram of the target physical addresses of FIG. 4, according to an embodiment. Data D1 through D16 can be read from, or written to, respective target physical addresses E through T depending on whether a read or write operation is performed. In this way, each of the logical addresses 1 through 16 are ultimately mapped to a respective one of the target physical addresses E through T. The data D1 through D16 can be stored in the data storage portion of the storage device (e.g., the memory devices 106 of the storage device 101 FIG. 1). In an embodiment, the memory devices 106 include flash memory, such as NAND flash memory, and the data storage device 101 includes a solid-state storage drive or device.

Figure 6:
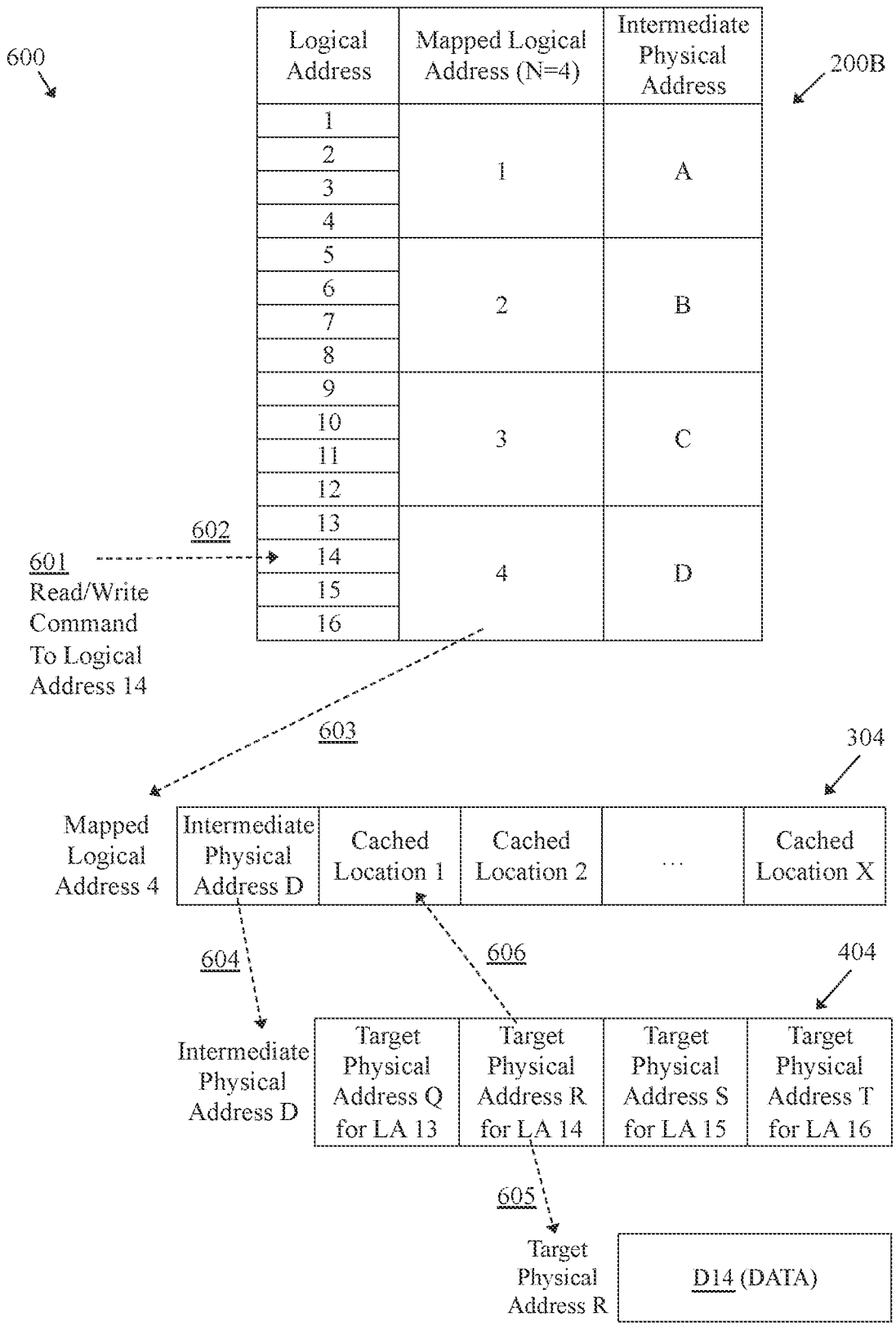
FIG. 6 illustrates a flow diagram of an example process for reading or writing data using the logical to physical address mapping techniques described herein, according to an embodiment.

FIG. 6 illustrates a flow diagram of an example process for reading or writing data using the logical to physical address mapping, according to an embodiment. In FIG. 6, an illustrative and non-limiting example process 600 is provided using the example data shown in FIGS. 1, 2B, 3, 4, and 5. At reference numeral 601, the accessing device 102 sends the data storage device 101 a command to read data from, or write data to, logical address 14. The controller 105 receives the command via the interface 104 and the data register 110. If the command is a write command, then the controller 105 also receives the data from the accessing device 102.

As represented by reference numeral 602, the controller 105 accesses the mapping table 200B stored in memory (e.g., the on-controller memory 113) and determines that the logical address 14 is mapped to mapped logical address 4. As represented by reference numeral 603, the controller 105 accesses the on-controller memory 113 and reads the data structure 304 at the mapped logical address 4. The data structure 304 at the mapped logical address 4 includes a pointer that is read by the controller 105 to the intermediate physical address D. The data structure 304 also includes cached locations 1 through X. The controller 105 can determine whether any of the cached locations 1 though X includes a pointer to the target physical address for logical address 14. If such pointer existed, then the controller 105 can go directly to the target physical address identified for logical address 14 and performs the appropriate read or write operation at the target physical address. If no cached location includes a pointer to the target physical address for logical address 14, the controller 105 is directed to the intermediate physical address D.

As represented by reference numeral 604, the controller 105 reads the data structure 404 at the intermediate physical address D, which includes pointers to target physical addresses Q, R. S, and T for respective logical addresses 13, 14, 15, and 16. Based on the initial read or write command for logical address 14, the controller 105 identifies the target physical address for logical address 14. In one embodiment, the intermediate physical address D is located in the on-controller memory 113. In another embodiment, the intermediate physical address D is located in the memory devices 106 of the data storage device 101.

As represented by reference numeral 605, the controller 105 accesses the memory device 106 and initiates a read or write operation on the target physical address R. If a read command, for example, then the actual data is read from the target physical address R and communicated back to the accessing device 102. If a write command, for example, then the data is written to the target physical address R. A confirmation that the data was successfully written can be communicated back to the accessing device 102.

In an embodiment, after the data structure 404 at the intermediate physical address D is read at reference numeral 604, the pointer to the target physical address R is also cached in a cached location (e.g., cached location 1) of data structure 304, as represented by reference numeral 606. In this way, the next time the data structure 304 is read for a read or write command for logical address 14, the pointer to the target physical address R is already available in the cached location 1 to point the controller to the target physical address R, without the controller 105 having to access the data structure 404 at the intermediate physical address D. If back at reference number 603, for example, the pointer to the target physical address R was already available in one of the cached locations of data structure 304, then the controller 105 reads the pointer in the cached location and can proceed directly to the target physical address R (reference numeral 605) instead of reading the data structure at the intermediate physical address (reference numeral 604).

Various caching scheme can be implemented to cache one or more of the pointers within the data structure for the interim physical address being accessed. For example, the most recently accessed pointer to a target physical address can be cached; the most recently accessed pointer for a read operation can be cached; the most recently accessed pointer for a write operation; a pointer other than the accessed pointer can be cached; etc.

The pointer stored in the cached location (also referred to as the "cached pointer") can remain in the cached location for various lengths of time as desired for the design or application. For example, the cached pointer can be stored until another pointer is cached and takes its place. In some instances, the controller can be configured to cache the accessed pointer for every read command, write command, or both. In this way, the last pointer accessed is cached, which can be useful if the same logical address is expected to be accessed frequently or before one of the other target physical addresses at the intermediate physical address is expected to be accessed. In some instances, the controller can be configured to cache one of the pointers other than the pointer for the read or write command. This can be useful, for example, if one of the other target physical addresses at the intermediate physical address is expected to be accessed frequently, or before the same logical address is expected to be accessed again.

The data structure at the mapped logical address (e.g., data structure 304) can be configured to include more than one cached location. In an embodiment, the data structure includes less than N–1 cached locations, such as 3 or less cached locations for the example shown in FIG. 6, where N=4. In such case, the first cached pointer can be cached in cached location 1, the second cached pointer can be cached in the cached location number 2, and so on until a cached pointer is cached in the last cached location number X. Any additional cached pointer can replace one of the existing cached pointers within the data structure. For instance, the additional cached pointer can replace the oldest cached pointer. It should be appreciated that the caching scheme is illustrative and not intended to be limiting. Any caching scheme can be implemented in other embodiments without compromising the underlying techniques of the disclosure.

In certain embodiments, the data structures at the intermediate physical address are stored in memory that cannot rewrite an address twice, such as with NAND flash memory. In such case, the controller manages (e.g., tracks and changes) the intermediate physical address and the target physical address and updates the logical-to-physical address mapping table accordingly. Because N logical addresses are mapped to the same mapped logical address and to the same intermediate physical address, the intermediate physical address is changed each time a subsequent write occurs for any of the N logical addresses. The controller also updates the logical-to-physical address mapping table and data structures accordingly.

For example, if an initial write operation occurs for logical address 14, the process occurs as described in FIG. 6. For instance, if at reference numeral 601, a first write operation occurs for logical address 14, then the mapping table 200B is accessed (reference numeral 602), the data structure 304 at mapped logical address 4 is read (reference numeral 603), the data structure 404 at the intermediate physical address is read (reference numeral 604), and the data D14 is written to the target physical address R (reference numeral 605). In an embodiment, the pointer to the target physical address R from data structure 404 can be saved in one of the cached locations 1 through X of the data structure 304 (reference numeral 606). However, when a subsequent write operation occurs for any of the N logical addresses mapped to the same mapped logical address 4 and intermediate physical address D as the logical address 14, the controller 105 performs certain changes to the intermediate physical address and the target physical address. Additional details regarding these changes are provided in FIG. 7.

Figure 7:
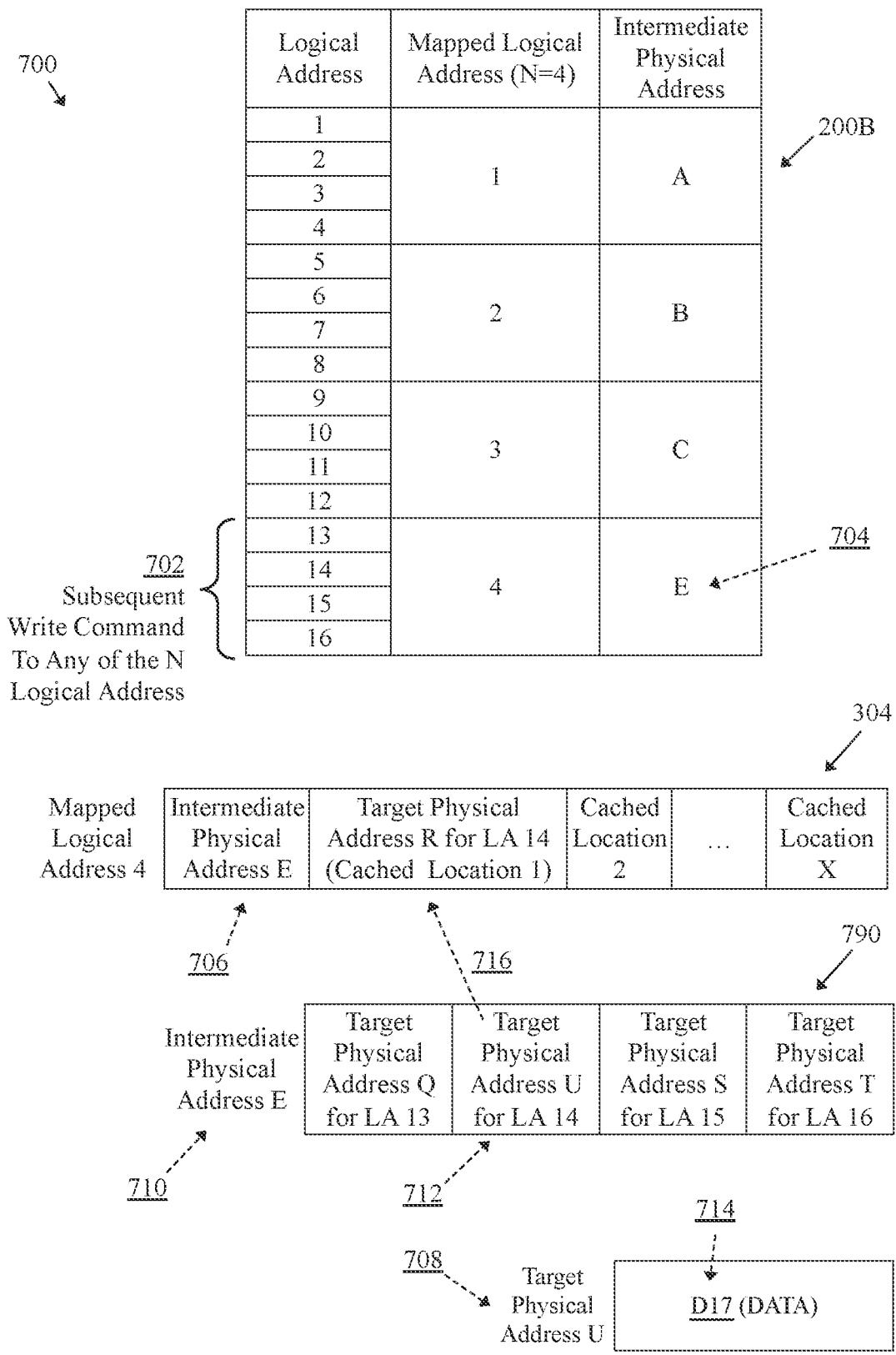
FIG. 7 illustrate flow diagrams of example processes for performing multiple writes to logical addresses mapped to the same mapped logical address and intermediate physical address, according to an embodiment.
Figure 8:
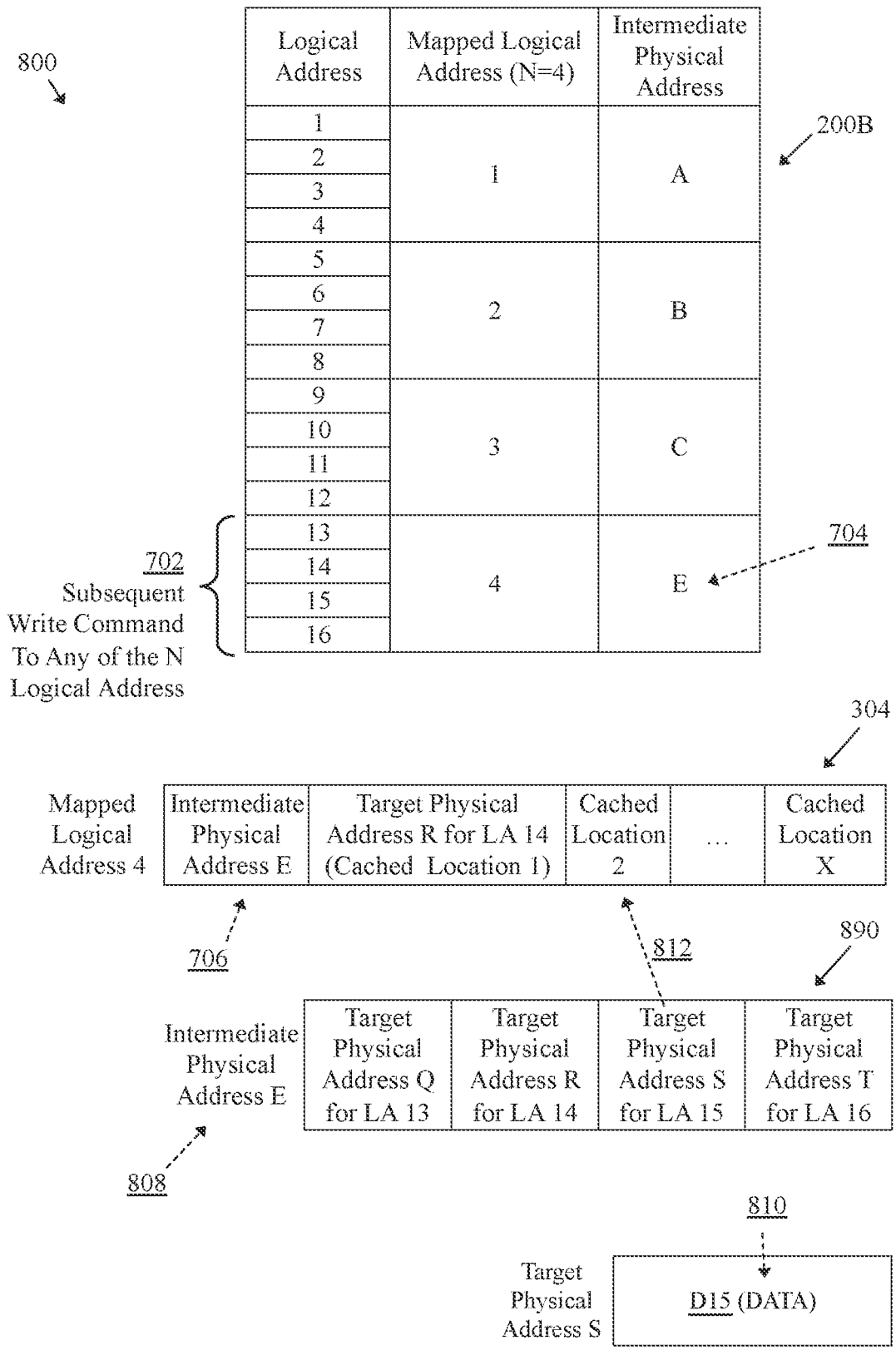
FIG. 8 illustrate flow diagrams of example processes for performing multiple writes to logical addresses mapped to the same mapped logical address and intermediate physical address, according to an embodiment.

FIGS. 7 and 8 illustrate flow diagrams of example processes for performing multiple writes to logical addresses mapped to the same mapped logical address and intermediate physical address, according to certain embodiments. In FIGS. 7 and 8, illustrative and non-limiting example processes 700 and 800, respectively, are provided using the example data shown in FIGS. 1, 2B, 3, 4, 5, and 6. The processes 700 and 800 are described together initially for similar parts of the processes, and then continued separately for different example situations.

For processes 700 and 800, when a subsequent write command is received for any of the N logical addresses mapped to the same mapped logical address 4 and intermediate physical address D as the logical address 14 (reference numeral 702), the controller 105 selects a new intermediate physical address (e.g., an intermediated address E) to replace the intermediate physical address D and updates the mapping table 200B accordingly, as represented by reference numeral 704. The controller 105 replaces the pointer to intermediate physical address D in the data structure 304 with a new pointer to the new intermediate physical address E, as represented by reference numeral 706. For instance, the data structure 304 can be stored in the on-controller memory 113, which can be DRAM that enables the same address to be rewritten. To facilitate understanding, the data structure 304 is shown including the pointer to the target physical address R for the logical address 14 in the cached location 1, which could have occurred at reference numeral 606 in FIG. 6 for the initial write to logical address 14, depending on the caching scheme implemented.

In an embodiment, the memory at the intermediate physical address and the target physical address can be memory that cannot rewrite an address twice, such as NAND flash memory. The process 700 in FIG. 7 continues as an example where the subsequent write command is for the logical address 14 again. The process 800 in FIG. 8 continues as an example where the subsequent write command is for the logical address 15, but could similarly apply to any of the other N logical addresses (i.e., logical addresses 13 and 16).

In the process 700 of FIG. 7, since the target physical address R cannot be rewritten, a new target physical address (e.g., a new target physical address U) is selected for the subsequent write command for logical address 14, as represented by reference numeral 708. The controller copies (or reads and then writes) the contents of the data structure 404 at the intermediate physical address D to a new data structure 790 at the new intermediate physical address E (reference numeral 710), except that the pointer to the new target physical address U for logical address 14 is written in place of the old pointer to the old target physical address R for logical address 14 (reference numeral 712). The controller 105 accesses the memory devices 106 and initiates a write operation on the new target physical address U for logical address 14, as represented by reference numeral 712. Data (D17) for the subsequent write command is written to the new target physical address U, as represented by reference numeral 714. A confirmation that the data D17 was successfully written can be communicated back to the accessing device 102. Depending on the particular caching scheme implemented, one of the pointers within data structure 790 at intermediate physical address E can be cached in one of the cached locations 1 through X of the data structure 304. For example, in one embodiment, the pointer to the new target physical address U for logical address 14 can be cached within cached location 1 and replace the former cached pointer to old target physical address R for logical address 14, as represented by reference numeral 716.

In the process 800 of FIG. 8, at reference numeral 808, the controller 105 copies the contents of the data structure 404 at the intermediate physical address D to a new data structure 890 at the new intermediate physical address E. The controller 105 determines that the target physical address S is for the logical address 15, which can occur when the controller reads the contents during the copy to the new data structure 890, for instance. The controller 105 accesses the memory devices 106 and initiates a write operation on the target physical address S for logical address 15, as represented by reference numeral 810. Data (D15) for the subsequent write command to logical address 15 is written to the target physical address S for the logical address 15. A confirmation that the data D17 was successfully written can be communicated back to the accessing device 102. Depending on the particular caching scheme implemented, one of the pointers within data structure 890 at intermediate physical address E can be cached in one of the cached locations 1 through X of the data structure 304. For example, in one embodiment, the pointer to the target physical address S for logical address 15 can be cached within cached location 2, as represented by reference numeral 812. In another embodiment, for instance, the pointer to the target physical address S for logical address 15 can be cached within cached location 1 and replace the former cached pointer to target physical address R for logical address 14.

In certain embodiments, overwriting physical address locations in the main memory is not permitted, such as with NAND memory for instance. In such case, when data at a target physical address location is to be modified (or new data added), the modified data (or new data) is written to a different physical address location. As a result, the data structure at the intermediate physical address needs to be updated to reflect the new target physical address location with the modified data (or new data). In the preferred embodiment, the data structure at the intermediate physical address is also stored in the main memory (e.g., NAND memory) where overwriting is restricted, and furthermore, the pointers in the data structure are contiguous. Therefore, to update the data structure, a "read/modify/write" operation is performed.

Using the data structure 404 in FIG. 4 as an example, if the data in target physical address R is to be replaced with new data, and the new data is stored in a new target physical address U, the pointer 414 needs to be updated to reflect the new target physical address U. To do so, a "read/modify/write" operation is performed where the data structure 404 is read, the pointer 414 is modified to point to the new target physical address U, and then whole modified set of data for the data structure 404 is written to a new location—e.g., new intermediate address E. Thereafter, the pointer 314 in the data structure 304 is modified to point to the new intermediate address E instead of the physical address D. The mapping table 200B (or the logical translation scheme) can also be modified accordingly to reflect the new intermediate physical address E.

In another embodiment, the data structure at the intermediate address can be stored in memory where there is not a restriction on overwriting, such as with resistive random-access memory (RERAM) for instance. In such case, the pointer 414 in the data structure 404 can be rewritten to point to the new target physical address E, without having to perform a "read/modify/write" operation on the data structure 404.

As stated earlier, it should be appreciated that the principles of the techniques presented herein for FIGS. 1 through 8 can be equally applicable to a wide range of data storage devices (or systems) with a controller, on-controller memory (e.g., DRAM), and memory devices for data storage (e.g., flash memory). For example, in one embodiment, the controller 105 of the data storage device 101 can be implemented with a distributed control architecture having a main controller and one or more distributed controllers coupled to the memory devices 106. In such case, the main controller manages each of the distributed controllers, with each of the distributed controllers controls a portion of the memory devices 106.

Figure 9:
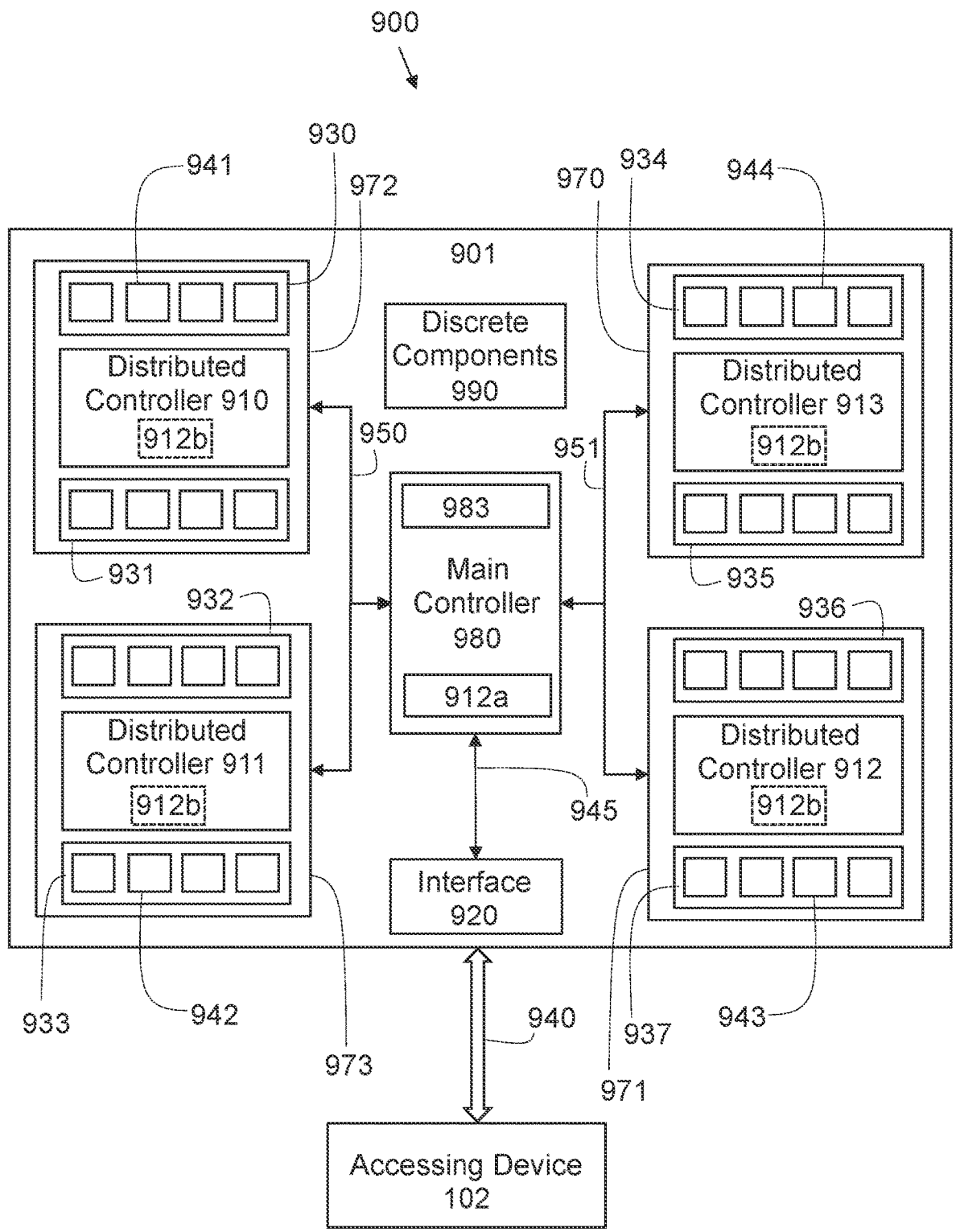
FIG. 9 illustrates a block diagram of an example data storage system having logical-to-physical address mapping capabilities and a distributed control architecture, according to an embodiment.

FIG. 9 is provided as an example configuration of a controller having a distributed control architecture, according to an embodiment. The example configuration is illustrative and not intended to be limiting. It should be appreciated that the main controller and the distributed controllers can collectively function as a single controller 105 that controls the memory devices 106, and thus the description for FIGS. 1 through 8 can apply here as well for FIG. 9. The distributed controller can be implemented in various scenarios or applications. As an example, the distributed controller can be implemented in a data storage device that operates in data centers where usage encompasses several scenarios. Some of the data may be accessed frequently and is "hot", while other data may be accessed infrequently and is practically "cold". Therefore, "hybrid" requirements may be present for the data storage device to accommodate (or account for). To accommodate these hybrid requirements, the data storage device can support technology that can be tailored to different usage scenarios. In an embodiment, the data storage device can be implemented having a distributed control architecture in order to more adequately accommodate the hybrid requirements.

FIG. 9 illustrates a block diagram of an example data storage system having logical-to-physical address mapping capabilities and a distributed control architecture, according to an embodiment. In FIG. 9, a storage system 900 is shown including a data storage device (or system) 901 communicatively coupled to an accessing device 102. The data storage device 901 is shown including a main controller 980, four memory modules 970, 971, 972 and 973, an interface 920, and discrete components 990. The data storage device 901 can be communicatively coupled to the accessing device 102 in a variety of manners and applications, such as similarly described in FIG. 1. In an embodiment, the main controller 980, the four memory modules 970, 971, 972 and 973, the accessing interface 920, and the discrete components 990 can be implemented on a main board that is coupled to the accessing device 102. In another embodiment, the main controller 980 and the distributed controllers 910, 911, 912, and 913 can be embedded or integrated, such as in a application-specific integrated circuit (ASIC) or field programmable gate array (FPGA) for example, and can functionally operation as a single controller. It should be appreciated that a different number of memory modules than four can also be implemented.

The main controller 980 can manage host accesses, memory management, and other background tasks, for example. The main controller 980 is shown coupled to the interface 920 of FIG. 9 via a bus 945. The main controller 980 is communicatively coupled to the accessing device 102 via the interface 920 that enables communication via the communication path 940 between the data storage device 901 and the accessing device 102. The interface 920 can include, for example, a PCIe, SATA, USB, Open CAPI, or any other standard or proprietary interface.

Each of the memory modules 970, 971, 972 and 973 is managed by the respective distributed controllers 913, 912, 910, and 911. Each of the distributed controllers 910, 911, 912, and 913 manages respective memory banks in its domain. In the example embodiment shown in FIG. 9, the distributed controller 913 manages memory banks 934 and 935; the distributed controller 912 manages memory banks 936 and 937; the distributed controller 910 manages memory banks 930 and 931; and the distributed controller 911 manages memory banks 932 and 933. A different number of memory banks may be managed by any distributed controller in other embodiments. In one embodiment, the data storage device 904 may include (or correspond to) an SSD. The main controller 980 communicates with the memory banks 930, 931, 932, 933, 934, 935, 936, and 937 via busses 950 and 951.

Each memory bank 931, 932, 933, 934, 935, 936, and 937 can have one or more memory devices. The memory banks 930 and 931 are shown having four memory devices 941; the memory banks 932 and 933 are shown having four memory devices 942; the memory banks 934 and 935 are shown having four memory devices 944; and the memory banks 936 and 937 are shown having four memory devices 943. The memory devices 941, 942, 943, and 944 shown are exemplary and are not an exhaustive list. Each memory bank, such as memory bank 930, can have several memory devices, and can have a different number of memory devices than shown in the example embodiment of FIG. 9. It should be appreciate that the discussion above for the features and functions of the memory devices 106 can also apply to the memory device 941, 942, 943, and 944. For the sake of clarity and brevity, the features and functions are not repeated here for FIG. 9.

Each of the memory banks 930, 931, 932, 933, 934, 935, 936, and 937 can be of a different technology. In some implementations, the data storage device 901 can operate in data centers where usage encompasses several scenarios. Some of the data may be accessed frequently and is "hot", while other data may be accessed infrequently and is practically "cold". In such case, for instance, the memory banks 930, 931, 932, 933, 934, 935, 936, and 937 can be configured of different technologies to accommodate (or account for) such "hybrid" requirements by supporting technology that can be tailored to different usage scenarios.

In an embodiment, the memory modules 970, 971, 972 and 973 can be mounted directly on a main board of the data storage device 901. In another embodiment, the memory module can be disposed a memory card that can be coupled to the main board of the data storage device 901 via sockets and ribbons connectors, for instance. The control of the various memory banks can be transparent to the accessing device 102 (e.g., a server or other host). The distributed controllers 910, 911, 912, and 913 shown in FIG. 9 may include an error correction code (ECC) engine. The distributed controllers 910, 911, 912, and 913 may be configured to support ECC and memory management schemes specific to the technology used by the memory modules 970, 971, 972, and 973. The memory devices 941, 942, 943, and 944 are illustrative examples of memory devices used in the memory banks 930, 931, 932, 933, 934, 935, 936, and 937. The number of memory devices implemented in a memory bank is not restricted to the number shown in FIG. 9. Other embodiments may include a different number of memory devices in each memory bank of each memory module. The memory modules 970, 971, 972 and 973 may include, for example, Flash, ReRam, MRAM, any other non-volatile memory (NVM) technology, or a combination of different technology devices.

The main controller 980 includes a logical-to-physical address mapping module 912a and on-controller memory 983. The on-controller memory 113 can include the features and functions of the on-controller memory 113 of FIG. 1A. The main controller 980 is coupled to the memory devices 941, 942, 943, and 944 via distributed controllers 910, 911, 912, and 913, respectively. The memory devices 941, 942, 943, and 944 can include the features and functions of the memory devices 106 of FIG. 1A. For the sake of brevity and clarity, every similar feature and function is not repeated here for FIG. 9.

In one embodiment, the features and functions of the logical-to-physical address mapping module 112 of FIG. 1 is shared between the logical-to-physical address mapping modules 912a and 912b. For example, in one embodiment, the logical-to-physical address mapping module 912a manages the logical to physical address mapping table (or the logical translation scheme) and the data structures at the mapped logical addresses, which are stored in the on-controller memory 983 of the main controller 980. Furthermore, each of the logical-to-physical address mapping modules 912b manages the data structures at the intermediate physical addresses and the data at the target physical addresses that are stored in the respective memory devices 941, 942, 943, and 944 controlled by the respective distributed controller 910, 911, 912, and 913. In such case, the logical-to-physical address mapping modules 912a of the main controller 980 communicates with, and works in conjunction with, the logical-to-physical address mapping modules 912b of the distributed controllers 910, 911, 912, and 913. For example, the logical-to-physical address mapping modules 912b can be configured to select the target physical addresses and read or write the pointers within the data structures at the intermediate physical addresses. The logical-to-physical address mapping modules 912b can be configured to communicate any selection of target physical addresses, or any pointers to target physical addresses, to the logical-to-physical address mapping modules 912a so that the corresponding updates to the contents of the data structure at the mapped logical addresses can be performed.

In another embodiment, the logical-to-physical address mapping module 912a manages the logical to physical address mapping table (or the logical translation scheme), the data structures at the mapped logical addresses, and the data structures at the intermediate physical addresses; while the logical-to-physical address mapping modules 912b manage the read and write operations of the data at the target physical addresses. In one implementation, the logical to physical address mapping table and the data structures at the mapped logical addresses are stored in the on-controller memory 983 of the main controller 980, while the data structures at the intermediate physical addresses and the data at the target physical addresses are stored in the memory devices 941, 942, 943, and 944. The main controller 980 can send instructions to the appropriate distributed controller 910, 911, 912, or 913 to perform any desired operations, such as reads, writes, modifications to data structures, etc.

It should be appreciated that any other functional distribution of the management of the logical to physical address mapping table (or the logical translation scheme), the data structures at the mapped logical addresses, and the data structures at the intermediate physical addresses that may be suitable for implementation are contemplated. For example, in one embodiment, one more distributed controllers (and not the main controller) can include cache memory and implement the techniques described herein—e.g., the management of the logical to physical address mapping table (or the logical translation scheme), the data structures at the mapped logical addresses, and the data structures at the intermediate physical addresses. In yet another embodiment, the management of the data structures of FIG. 3 can be divided between the main controller and one or more distributed controllers, such that a portion is managed by the main controller and another portion by a distributed controller. The management of the data structures of FIG. 4 can also be divided between the main controller and one or more distributed controllers, such that a portion is managed by the main controller and another portion by a distributed controller.

Figure 10:
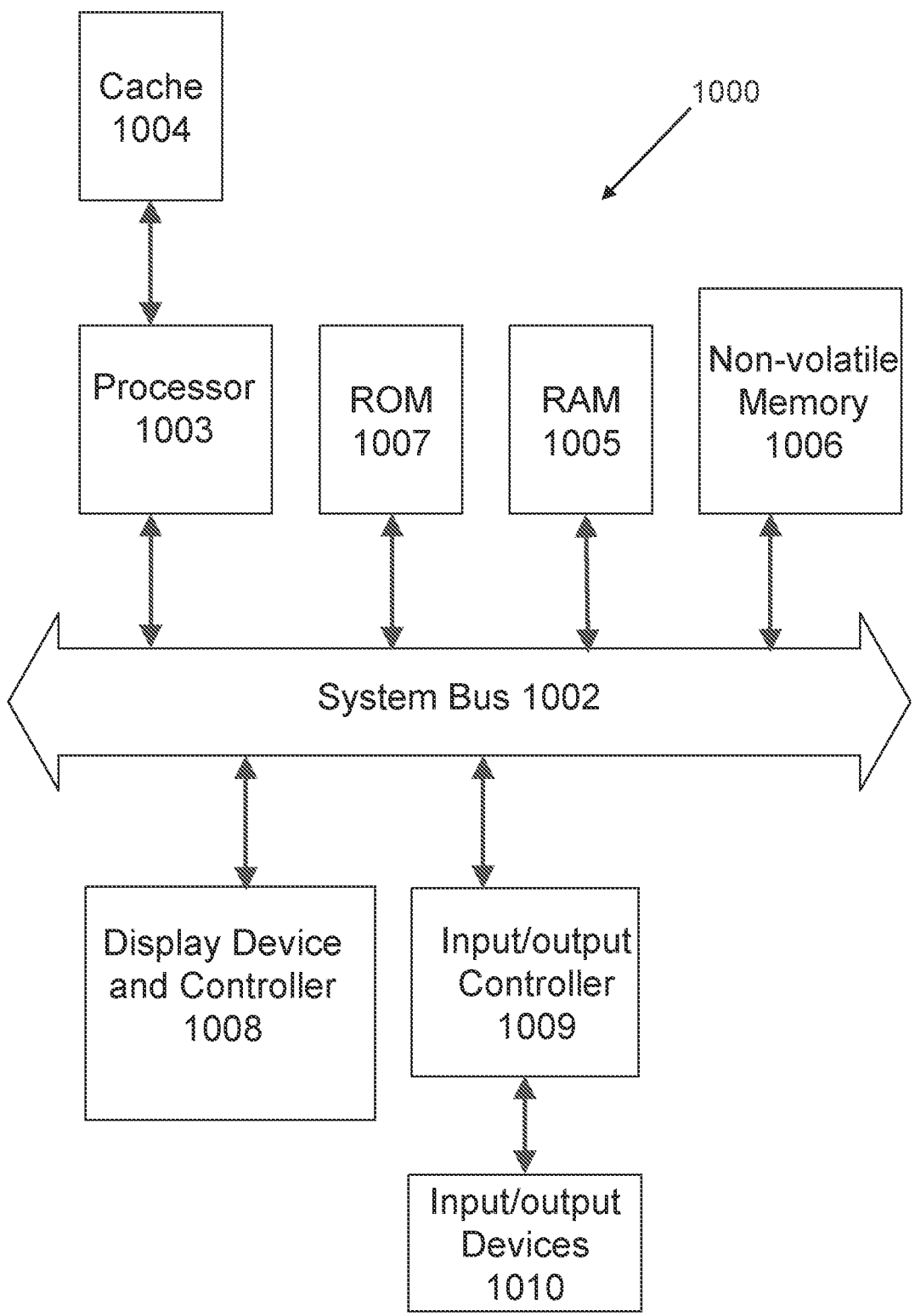
FIG. 10 depicts a block diagram of an exemplary computer system (e.g., accessing device), according to an embodiment.

FIG. 10 depicts a block diagram of an exemplary computer system (e.g., accessing device), according to an embodiment. Note that while FIG. 10 illustrates various components of a computer system, it is not intended to represent any particular architecture or manner of interconnecting the components. The computer system 1000 shown in FIG. 10 may represent an example accessing device (e.g., the accessing devices 102), such as a server for example. It is also be appreciated that networked computers and other data processing systems which have fewer components, or more components, can also be implemented as the computer system.

As shown, the host system 1000 includes a system bus 1002, which is coupled to a microprocessor 1003, a Read-Only Memory (ROM) 1007, a volatile Random Access Memory (RAM) 1005, as well as other non-volatile memory 1006. In the illustrated embodiment, microprocessor 1003 is coupled to cache memory 1004. A system bus 1002 can be adapted to interconnect these various components together and also interconnect components 1003, 1007, 1005, and 1006 to other devices, such as a display controller and display device 1008, and to peripheral devices such as input/output ("I/O") devices 1010. Types of I/O devices can include keyboards, modems, network interfaces, printers, scanners, video cameras, or other devices well known in the art. Typically, I/O devices 1010 are coupled to the system bus 1002 through I/O controllers 1009. In one embodiment the I/O controller 1009 includes a Universal Serial Bus ("USB") adapter for controlling USB peripherals or other type of bus adapter.

RAM 1005 can be implemented as dynamic RAM ("DRAM"), which requires power continually in order to refresh or maintain the data in the memory. The other non-volatile memory 1006 can include a magnetic hard drive, magnetic optical drive, optical drive, DVD RAM, solid-state storage drive (e.g., the data storage device 101 of FIG. 1), or other type of memory system that maintains data after power is removed from the system. While FIG. 10 shows that non-volatile memory 1006 as a local device coupled with the rest of the components in the computer system 1000, it will be appreciated by skilled artisans that the described techniques may use a non-volatile memory remote from the system, such as a network storage device coupled with the host system through a network interface, such as a modem, Ethernet interface, or any other standard or proprietary interface. In certain embodiments, the non-volatile memory 606 can be coupled directly to the processor 603 instead of through the system bus 602 so that the processor 602 can talk directly to the non-volatile memory 606, such as with a non-volatile dual in-line memory module (NVDIMM).

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations, or operations in an order. Accordingly, the scope and spirit of the invention should only be judged in terms of any accompanying claims that may be appended, as well as any legal equivalents thereof.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, embodiments other than those specific described above are equally possible within the scope of any accompanying claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

For purposes of explanation, numerous specific details are set forth in order to provide a thorough understanding of the description. It should be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein. It should be appreciated that the block diagrams may include additional components that are not necessarily shown or described, but which have been left out for the sake of clarity and brevity.

The processes and features described herein may be implemented in software, hardware, or a combination of software and hardware. The processes and features may be implemented as software modules, hardware modules, special-purpose hardware (e.g., application specific hardware, ASICs, DSPs, etc.), embedded controllers, hardwired circuitry, hardware logic, etc. Software content (e.g., data, instructions, and configuration) may be provided via an article of manufacture including a non-transitory, tangible computer or machine-readable storage medium, which provides content that represents instructions that can be executed. The content may result in a computer performing various functions/operations described herein.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory that, when read and executed by a processor, cause the processor to perform operations to execute the processes and features described herein. The processes and features described herein may be implemented in software, firmware, hardware (e.g., an application specific integrated circuit, or a field-programmable gate array (FPGA)), or any combination thereof. For example, the controllers described herein can include one or more processors (or processing units) that may be implemented as described above to execute the instructions. The term "processor" is used broadly herein and may include one or more processing units or circuitry, such as one or more embedded or non-embedded processors, microprocessors, hard and soft microprocessor cores, etc.

In an implementation, the processes and features described herein may be implemented as a series of executable modules run by a processor (e.g., in a computer system, individually, collectively in a distributed computing environment, embedded in a controller, etc.). The foregoing modules may be realized by hardware, executable modules stored on a computer-readable medium (or machine-readable medium), or a combination of both. For example, the modules may comprise a plurality or series of instructions to be executed by a processor in a hardware system. Initially, the series of instructions may be stored in memory, such as on a storage device. However, the series of instructions can be stored on any suitable computer readable storage medium. Furthermore, the series of instructions need not be stored locally, and could be received from a remote storage device, such as a server on a network, via the network interface. In various implementations, a module or modules can be executed by a processor or multiple processors in one or multiple locations, such as multiple servers in a parallel processing environment A computer-readable (or machine-readable) storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, Flash memory devices, etc.); other similar non-transitory (or transitory), tangible (or non-tangible) storage medium; or any type of medium suitable for storing, encoding, or carrying a series of instructions for execution by a processor to perform any one or more of the processes and features described herein. The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

What is claimed is:

1. A solid-state storage system, comprising:
a controller;
on-controller memory configured to provide instructions for execution by the controller to perform operations; and
a plurality of memory devices coupled to the controller, the plurality of memory devices for storing data and comprising non-volatile memory;
wherein the controller is configured to:
manage a logical-to-physical address mapping for mapping a plurality of logical addresses to a plurality of target physical addresses, wherein the plurality of logical addresses comprises a plurality of groups of logical addresses having more than one logical address, wherein each group of the plurality of groups is mapped to a respective mapped logical address of a plurality of mapped logical addresses such that each logical address of a respective group is mapped to the respective mapped logical address, wherein the target physical addresses are locations in the plurality of memory devices, and wherein the plurality of mapped logical addresses are locations in the on-controller memory;
manage a plurality of first data structures comprising a respective first data structure at each respective mapped logical addresses, wherein each respective first data structure comprises a respective first pointer that points to a respective intermediate physical address of a plurality of intermediate physical addresses; and
manage a plurality of second data structures comprising a respective second data structure at each respective intermediate physical address, wherein each respective second data structure comprises a respective plurality of second pointers that each point to respective target physical addresses of the plurality of target physical addresses, and wherein each respective plurality of second pointers comprises a second pointer for each logical address in one of the plurality of groups of logical addresses.

2. The solid-state storage system of claim 1, wherein at least one first data structure further comprises a cached location for an alternative pointer to a target physical addresses, and wherein the managing of the plurality of second data structures comprises:
caching the alternative pointer to the cached location of the at least one first data structure; and
mapping one of the logical addresses based on the alternative pointer instead of the respective first pointer in the at least one first data structure.

3. The solid-state storage system of claim 2, wherein the at least one first data structure comprises less than or equal to N−1 number of pointers to target physical addresses stored in cached locations, wherein the respective group of logical addresses that is mapped to the at least one first data structure has N number of logical addresses, and wherein the N−1 number of pointers to target physical addresses is stored in cached locations for the respective group of logical addresses.

4. The solid-state storage system of claim 3, wherein the on-controller memory comprises dynamic random access memory (DRAM), wherein the plurality of first data structures is located in the DRAM, and wherein the plurality of second data structures is located in the plurality of memory devices and absent in the on-controller memory.

5. The solid-state storage system of claim 2, wherein the at least one first data structure further comprises additional cached locations for additional alternative pointers to target physical addresses, wherein the managing of the plurality of second data structures further comprises:
    caching the additional alternative pointers to the additional cached location of the at least one first data structure; and
    mapping additional logical addresses based on the additional alternative pointers instead of the respective first pointer in the at least one first data structure.

6. The solid-state storage system of claim 2, wherein the caching of the alternative pointer is performed in response to reading one of the second data structures, and wherein the alternative pointer comprises one of the second pointer from read second data structure.

7. The solid-state storage system of claim 1, wherein the on-controller memory comprises dynamic random access memory (DRAM), wherein the plurality of first data structures is located in the DRAM, and wherein the plurality of second data structures is located in the plurality of memory devices and absent in the on-controller memory.

8. A method for mapping logical addresses to target physical address in a solid-state storage system, the method comprising:
    receiving, by a controller, instructions from an on-controller memory, the instructions for execution by the controller to perform operations; and
    sending, by the controller, read and write commands to a plurality of memory devices coupled to the controller, the plurality of memory devices for storing data and comprising non-volatile memory;
    managing, by the controller, a logical-to-physical address mapping for mapping a plurality of logical addresses to a plurality of target physical addresses, wherein the plurality of logical addresses comprises a plurality of groups of logical addresses having more than one logical address, wherein each group of the plurality of groups is mapped to a respective mapped logical address of a plurality of mapped logical addresses such that each logical address of a respective group is mapped to the respective mapped logical address, wherein the target physical addresses are locations in the plurality of memory devices, and wherein the plurality of mapped logical addresses are locations in the on-controller memory;
    managing, by the controller, a plurality of first data structures comprising a respective first data structure at each respective mapped logical addresses, wherein each respective first data structure comprises a respective first pointer that points to a respective intermediate physical address of a plurality of intermediate physical addresses;
    managing, by the controller, a plurality of second data structures comprising a respective second data structure at each respective intermediate physical address, wherein each respective second data structure comprises a respective plurality of second pointers that each point to respective target physical addresses of the plurality of target physical addresses, and wherein each respective plurality of second pointers comprises a second pointer for each logical address in one of the respective plurality of groups of logical addresses.

9. The method of claim 8, wherein at least one first data structure further comprises a cached location for an alternative pointer to a target physical addresses, and wherein the managing of the plurality of second data structures comprises:
    caching the alternative pointer to the cached location of the at least one first data structure; and
    mapping one of the logical addresses based on the alternative pointer instead of the respective first pointer in the at least one first data structure.

10. The method of claim 9, wherein the at least one first data structure comprises less than or equal to N−1 number of pointers to target physical addresses stored in cached locations, wherein the respective group of logical addresses that is mapped to the at least one first data structure has N number of logical addresses, and wherein the N−1 number of pointers to target physical addresses is stored in cached locations for the respective group of logical addresses.

11. The method of claim 10, wherein the on-controller memory comprises dynamic random access memory (DRAM), wherein the plurality of first data structures is located in the DRAM, and wherein the plurality of second data structures is located in the plurality of memory devices and absent in the on-controller memory.

12. The method of claim 9, wherein the at least one first data structure further comprises additional cached locations for additional alternative pointers to target physical addresses, wherein the managing of the plurality of second data structures further comprises:
    caching the additional alternative pointers to the additional cached location of the at least one first data structure; and
    mapping additional logical addresses based on the additional alternative pointers instead of the respective first pointer in the at least one first data structure.

13. The method of claim 9, wherein the caching of the alternative pointer is performed in response to reading one of the second data structures, and wherein the alternative pointer comprises one of the second pointer from read second data structure.

14. The method of claim 8, wherein the on-controller memory comprises dynamic random access memory (DRAM), wherein the plurality of first data structures is located in the DRAM, and wherein the plurality of second data structures is located in the plurality of memory devices and absent in the on-controller memory.

15. A non-transitory computer-readable storage medium storing one or more programs for execution by a controller of a solid-state storage system, the one or more programs including instructions for performing operations comprising:
    receiving, by a controller, instructions from an on-controller memory, the instructions for execution by the controller to perform operations; and
    sending, by the controller, read and write commands to a plurality of memory devices coupled to the controller, the plurality of memory devices for storing data and comprising non-volatile memory;
    managing, by the controller, a logical-to-physical address mapping for mapping a plurality of logical addresses to a plurality of target physical addresses, wherein the plurality of logical addresses comprises a plurality of groups of logical addresses having more than one logical address, wherein each group of the plurality of groups is mapped to a respective mapped logical address of a plurality of mapped logical addresses such that each logical address of a respective group is mapped to the respective mapped logical address, wherein the target physical addresses are locations in the plurality of memory devices, and wherein the plurality of mapped logical addresses are locations in the on-controller memory;

managing, by the controller, a plurality of first data structures comprising a respective first data structure at each respective mapped logical addresses, wherein each respective first data structure comprises a respective first pointer that points to a respective intermediate physical address of a plurality of intermediate physical addresses;

managing, by the controller, a plurality of second data structures comprising a respective second data structure at each respective intermediate physical address, wherein each respective second data structure comprises a respective plurality of second pointers that each point to respective target physical addresses of the plurality of target physical addresses, and wherein each respective plurality of second pointers comprises a second pointer for each logical address in one of the respective plurality of groups of logical addresses.

16. The non-transitory computer-readable storage medium of claim 15, wherein at least one first data structure further comprises a cached location for an alternative pointer to a target physical addresses, and wherein the managing of the plurality of second data structures comprises:

caching the alternative pointer to the cached location of the at least one first data structure; and mapping one of the logical addresses based on the alternative pointer instead of the respective first pointer in the at least one first data structure.

17. The non-transitory computer-readable storage medium of claim 16, wherein the at least one first data structure comprises less than or equal to N−1 number of pointers to target physical addresses stored in cached locations, wherein the respective group of logical addresses that is mapped to the at least one first data structure has N number of logical addresses, and wherein the N−1 number of pointers to target physical addresses is stored in cached locations for the respective group of logical addresses.

18. The non-transitory computer-readable storage medium of claim 17, wherein the on-controller memory comprises dynamic random access memory (DRAM), wherein the plurality of first data structures is located in the DRAM, and wherein the plurality of second data structures is located in the plurality of memory devices and absent in the on-controller memory.

19. The non-transitory computer-readable storage medium of claim 16, wherein the at least one first data structure further comprises additional cached locations for additional alternative pointers to target physical addresses, wherein the managing of the plurality of second data structures further comprises:

caching the additional alternative pointers to the additional cached location of the at least one first data structure; and mapping additional logical addresses based on the additional alternative pointers instead of the respective first pointer in the at least one first data structure.

20. The non-transitory computer-readable storage medium of claim 16, wherein the caching of the alternative pointer is performed in response to reading one of the second data structures, and wherein the alternative pointer comprises one of the second pointer from read second data structure.

\* \* \* \* \*